United States Patent
Kito et al.

(10) Patent No.: US 7,857,399 B2
(45) Date of Patent: Dec. 28, 2010

(54) ANTI-SKID CONTROL APPARATUS FOR VEHICLE

(75) Inventors: Yoshiaki Kito, Nagoya (JP); Katsuo Obai, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 781 days.

(21) Appl. No.: 11/812,314

(22) Filed: Jun. 18, 2007

(65) Prior Publication Data

US 2008/0001475 A1 Jan. 3, 2008

(30) Foreign Application Priority Data

Jun. 28, 2006 (JP) ............................. 2006-177874

(51) Int. Cl.
B60T 8/36 (2006.01)

(52) U.S. Cl. ................. 303/119.1; 303/116.1; 303/156; 303/162

(58) Field of Classification Search ................. 303/157, 303/158, 161, 162, 113.1, 114.3, 116.1, 119.1, 303/156

See application file for complete search history.

(56) References Cited

U.S. PATENT DOCUMENTS

| | | | |
|---|---|---|---|
| 5,927,831 A * | 7/1999 | Friederichs et al. ......... | 303/156 |
| 7,080,890 B2 * | 7/2006 | Scheller et al. ........... | 303/113.1 |
| 2002/0021044 A1 * | 2/2002 | Hara et al. ............. | 303/16 |
| 2003/0214177 A1 * | 11/2003 | Kusano et al. .......... | 303/113.1 |
| 2006/0049687 A1 * | 3/2006 | Iizuka et al. .......... | 303/11 |
| 2006/0255659 A1 * | 11/2006 | Obai ................... | 303/146 |
| 2007/0069577 A1 * | 3/2007 | Nakaura et al. ........ | 303/155 |

FOREIGN PATENT DOCUMENTS

| | | | |
|---|---|---|---|
| JP | 2003-019952 A | 1/2003 | |
| JP | 2005-030453 A | 2/2005 | |

* cited by examiner

*Primary Examiner*—Thomas J Williams
(74) *Attorney, Agent, or Firm*—Buchanan Ingersoll & Rooney PC

(57) ABSTRACT

An anti-skid control apparatus controls the value of electric current, which is being applied to the first solenoid valve and equal to or greater than the predetermined electric current value, to a value of electric current corresponding to the pressure difference between the master cylinder pressure and the wheel cylinder pressure at a time point where the pressure-increasing control is started; and changes the value of electric current in a direction to be reduced for a first period of time during the pressure-increasing control as the estimated amount of the wheel cylinder pressure reduced by the pressure-reducing control is increased, when the estimated amount of the wheel cylinder pressure reduced by the pressure-reducing control is equal to or greater than a predetermined value.

9 Claims, 12 Drawing Sheets

ANTI-SKID CONTROL APPARATUS FOR VEHICLE

CROSS REFERENCE TO RELATED APPLICATIONS

This application is based on and claims priority under 35 U.S.C. §119 to Japanese Patent Application 2006-177874, filed on Jun. 28, 2006, the entire content of which is incorporated herein by reference.

FIELD OF THE INVENTION

The present invention relates to an anti-skid control apparatus for a vehicle, which apparatus executes an anti-skid control (hereinafter referred to as an ABS control) for preventing a vehicle wheel from slipping excessively.

BACKGROUND

Anti-skid control apparatuses for executing an ABS control by controlling a brake fluid pressure (hereinafter referred to as a wheel cylinder pressure) within a wheel cylinder have been mounted on a wide variety of vehicles. Such anti-skid control apparatus generally includes a normally opened solenoid valve (pressure-increasing valve) and a normally closed solenoid valve (pressure-reducing valve). The normally opened solenoid valve is provided at a hydraulic pressure circuit connecting the master cylinder to the wheel cylinder and the normally closed solenoid valve is provided at a hydraulic pressure circuit connecting the wheel cylinder to a reservoir. The master cylinder generates a brake fluid pressure (hereinafter, referred to as a master cylinder pressure) responsive to a brake operation by a driver. In this configuration, a pressure-reducing control, a sustaining control and a pressure-increasing control for the wheel cylinder pressure are executed by controlling the pressure-increasing valve and the pressure-reducing valve respectively.

The ABS control is generally started and executed for the vehicle wheel at which a predetermined ABS control start condition is established. Specifically, the ABS control is achieved by executing the pressure-increasing control at least after the pressure-reducing control is executed. When the ABS control start condition is established again while the pressure-increasing control in the current ABS control is being executed, the pressure-increasing control is terminated and a next ABS control (a pressure-reducing control of a next ABS control) is started continuously. That is, considering that a period of time from where the ABS control start condition is established to where the ABS control start condition is established in the next place is referred to as a control cycle, generally, an ABS control is carried on with multiple and continuous control cycles.

Recent requirements have led to a control for smoothly (steplessly) increasing the wheel cylinder pressure during the pressure-increasing control. Hereinafter, such control is referred to as a linear pressure-increasing control. In order to cope with this situation, as disclosed in JP2003-19952A, a linear solenoid valve, especially a normally opened linear solenoid valve, has been adopted as a pressure-increasing valve for the anti-skid control apparatus. Specifically, such linear solenoid valve can (steplessly) modify a pressure difference between the master cylinder pressure and the wheel cylinder pressure in accordance with a value of electric current value linearly controlled.

As for a normally opened linear solenoid valve, generally, a pressure difference, which corresponds to a suction force, varies in proportion to a value of electric current (command electric current). The pressure difference is hereinafter referred to as a command pressure difference. Accordingly, the normally opened linear solenoid valve serving as the pressure-increasing valve is controlled so as to disconnect a fluid communication between the master cylinder and the wheel cylinder when the command pressure difference determined in accordance with the electric current value is larger than an actual pressure difference. The normally opened linear solenoid valve is controlled so as to establish the fluid communication therebetween when the command pressure difference is smaller than the actual pressure difference. As a result, the brake fluid flows from the master cylinder-side into the wheel cylinder, and an actual pressure difference becomes small as the wheel cylinder pressure is increased. When the actual pressure difference becomes equal to the command pressure difference, the actual pressure difference matches the command pressure difference.

In other words, in order to achieve the linear pressure-increasing control with a normally opened linear solenoid valve as a pressure-increasing valve, with the pressure-reducing valve in a closed state, first of all, a value of actual electric current for the normally opened linear solenoid valve is set to a value of electric current corresponding to an actual pressure difference at a starting point of the linear pressure-increasing control. The value of electric current corresponding to the actual pressure difference is a value of electric current for matching the command pressure difference with the actual pressure difference and is hereinafter referred to as an actual pressure difference corresponding electric current value. Subsequently, the value of actual electric current is needed to be linear reduced with a constant gradient corresponding to a target gradient for increasing the wheel cylinder pressure. Thus, from the starting point of the linear pressure-increasing control, the actual pressure difference is smoothly reduced, as a result, during the linear pressure-increasing control, the wheel cylinder pressure can be smoothly increased having a gradient that is identical to the target increasing gradient.

When the pressure reducing control or the pressure-sustaining control is shifted to the linear pressure-increasing control, the linear solenoid valve travels from a closed state to an opened state. In here, for example due to a delay in opening the linear solenoid valve that may occur as a result of a response delay thereof (control delay), there is a possible case that the wheel cylinder pressure underruns a value corresponding to the basic electric current value (target value) at an early stage of the linear pressure-increasing control. Hereinafter, such delay is referred to as a wheel cylinder pressure-increasing delay. The wheel cylinder pressure-increasing delay becomes remarkable as a gradient of the basic electric current value becomes larger or increases, i.e., as the target gradient for increasing the wheel cylinder pressure becomes larger or increases.

In the light of the forgoing, JP2005-30453A discloses therein that a value of actual electric current of the linear solenoid valve is intentionally shifted from the basic electric current value by a predetermined electric current amount (first electric current amount) in a direction to reduce the actual pressure difference. Here, "a direction to reduce the actual pressure difference" represents a direction for reducing a value of actual electric current for the normally opened linear solenoid valve and a direction for increasing a value of actual electric current for the normally closed linear solenoid valve. As a result, a valve body of the linear solenoid valve travels easily in an opening direction and a delay in opening the valve body is restrained, which restrains a wheel cylinder pressure-increasing delay.

However, in a case where the gradient of the basic electric current value is large, even though a value of actual electric current of a linear solenoid valve is changed from the basic electric current value during the linear pressure-increasing control by the first electric current amount in a direction for reducing the actual pressure difference, the inventors verified that the wheel cylinder pressure-increasing delay becomes large.

The present invention has been made in view of the above circumstances and provides an anti-skid control apparatus which executes an ABS control with a linear solenoid valve as a pressure-increasing valve and effectively restrains a wheel cylinder pressure-increasing delay.

SUMMARY OF THE INVENTION

According to an aspect of the present invention, an anti-skid control apparatus includes: a master cylinder pressurizing a brake fluid and generating a master cylinder pressure in response to an operation at a brake pedal; a wheel cylinder mounted at a wheel and connected to the master cylinder via a first fluid passage, the wheel cylinder applying a wheel cylinder pressure, which is generated based upon the master cylinder pressure, to the wheel; a first solenoid valve disposed at the first fluid passage, the first solenoid valve configured to vary between a closed state and an opened state in response to a value of electric current applied thereto, so that a pressure difference between the master cylinder pressure and the wheel cylinder pressure is adjusted in response to the value of electric current applied thereto and a fluid communication between the master cylinder and the wheel cylinder via the first fluid passage is interrupted with the first solenoid valve in the closed state when the first solenoid valve is applied with electric current at a value equal to or greater than a predetermined electric current value (Ihold); a second solenoid valve connected to the wheel cylinder at one port via a second fluid passage and connected to a reservoir at the other port, the second solenoid valve configured to selectively be in a closed state or an opened state in response to a value of electric current applied thereto so that a fluid communication between the wheel cylinder and the reservoir via the second fluid passage is interrupted when the second solenoid valve is in the closed state and is established when being in the opened state; and a hydraulic pump having a suction portion connected to the reservoir and an outlet portion connected to the first fluid passage between the master cylinder and the first solenoid valve.

When the anti-skid control apparatus confirms the wheel is to be locked in response to the operation at the brake pedal, the anti-skid control apparatus executes a pressure-reducing control for draining brake fluid in the wheel cylinder to the reservoir and reducing the wheel cylinder pressure by applying electric current at the value equal to or greater than the predetermined electric current value to the first solenoid valve and controlling the first solenoid valve to the closed state and by applying electric current to the second solenoid valve and controlling the second solenoid valve to the opened state. When the anti-skid control apparatus confirms that the wheel is no longer to be locked by the pressure-reducing control, the anti-skid control apparatus executes a pressure-increasing control for gradually increasing the wheel cylinder pressure reduced by the pressure-reducing control: by applying electric current to the second solenoid valve and controlling the second solenoid valve to the closed state; by estimating an amount of the wheel cylinder pressure reduced by the pressure-reducing control; and by reducing the pressure difference by gradually reducing the value of electric current, which is being applied to the first solenoid valve and is equal to or greater than the predetermined electric current value, with a first gradient that varies greatly as the estimated amount of the wheel cylinder pressure reduced by the pressure-reducing control becomes larger or increases. The anti-skid control apparatus further includes: electric current controlling means for controlling the value of electric current, which is being applied to the first solenoid valve and equal to or greater than the predetermined electric current value, to a value of electric current corresponding to the pressure difference between the master cylinder pressure and the wheel cylinder pressure at a time point where the pressure-increasing control is started; and changing means for changing the value of electric current controlled by the electric current controlling means in a direction to be reduced for a first period of time during the pressure-increasing control as the estimated amount of the wheel cylinder pressure reduced by the pressure-reducing control becomes larger or increases, when the estimated amount of the wheel cylinder pressure reduced by the pressure-reducing control is equal to or greater than a predetermined value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow with reference to the attached drawings.

Figure 1:
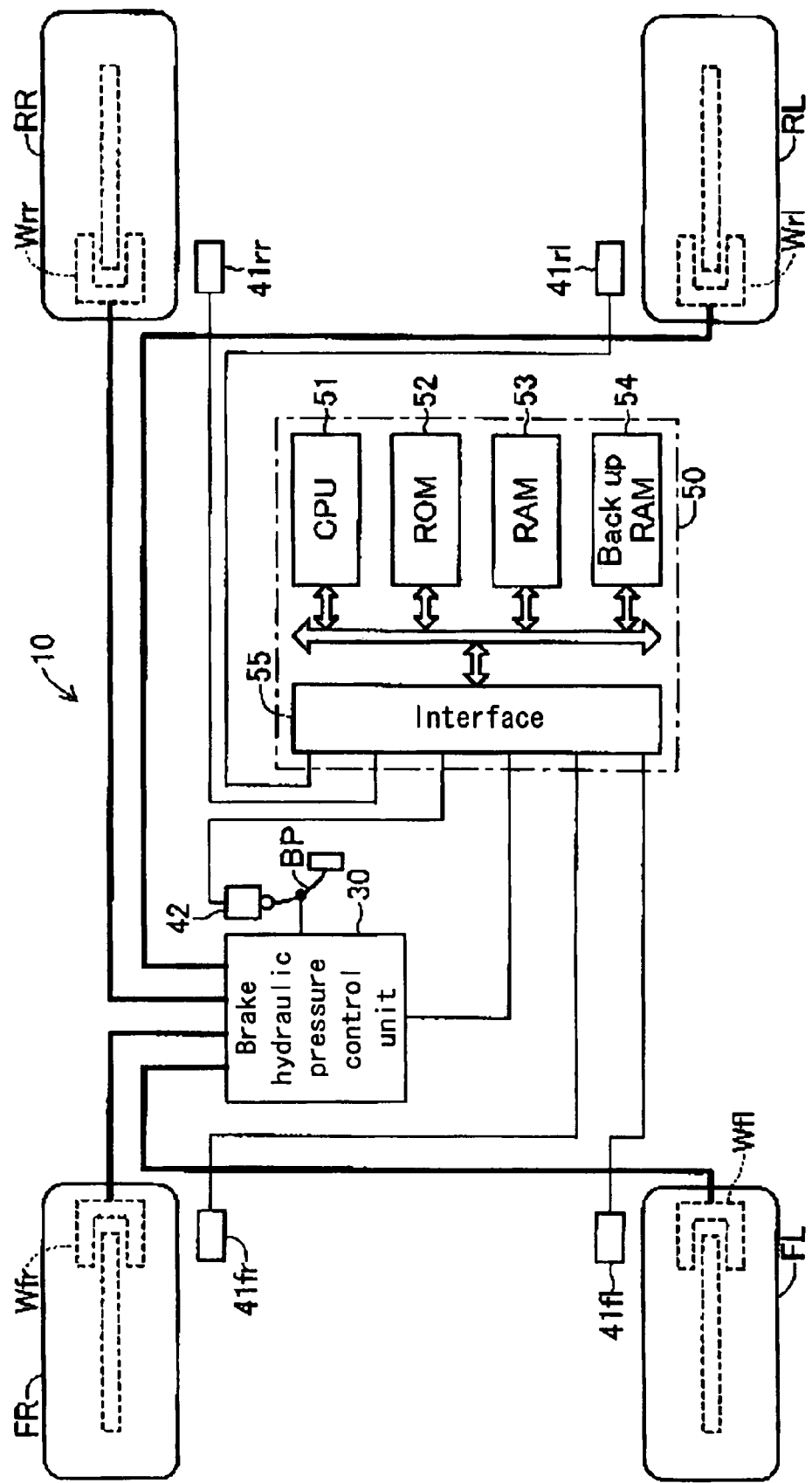
FIG. 1 is a schematic view illustrating a brake apparatus for a vehicle having an anti-skid control apparatus according to an embodiment of the present invention.

An embodiment of an anti-skid control apparatus for a vehicle related to the present invention will be explained in accordance with the attached drawings. FIG. 1 is a schematic view illustrating a vehicle to which a brake apparatus 10, including the anti-skid control apparatus according to the embodiment of the present invention, is mounted. The vehicle has four wheels including two front wheels (a right-front wheel FR and a left-front wheel FL) serving as driven wheels and two rear wheels (a right-rear wheel RR and a left-rear wheel RL) serving as driving wheels.

Figure 2:
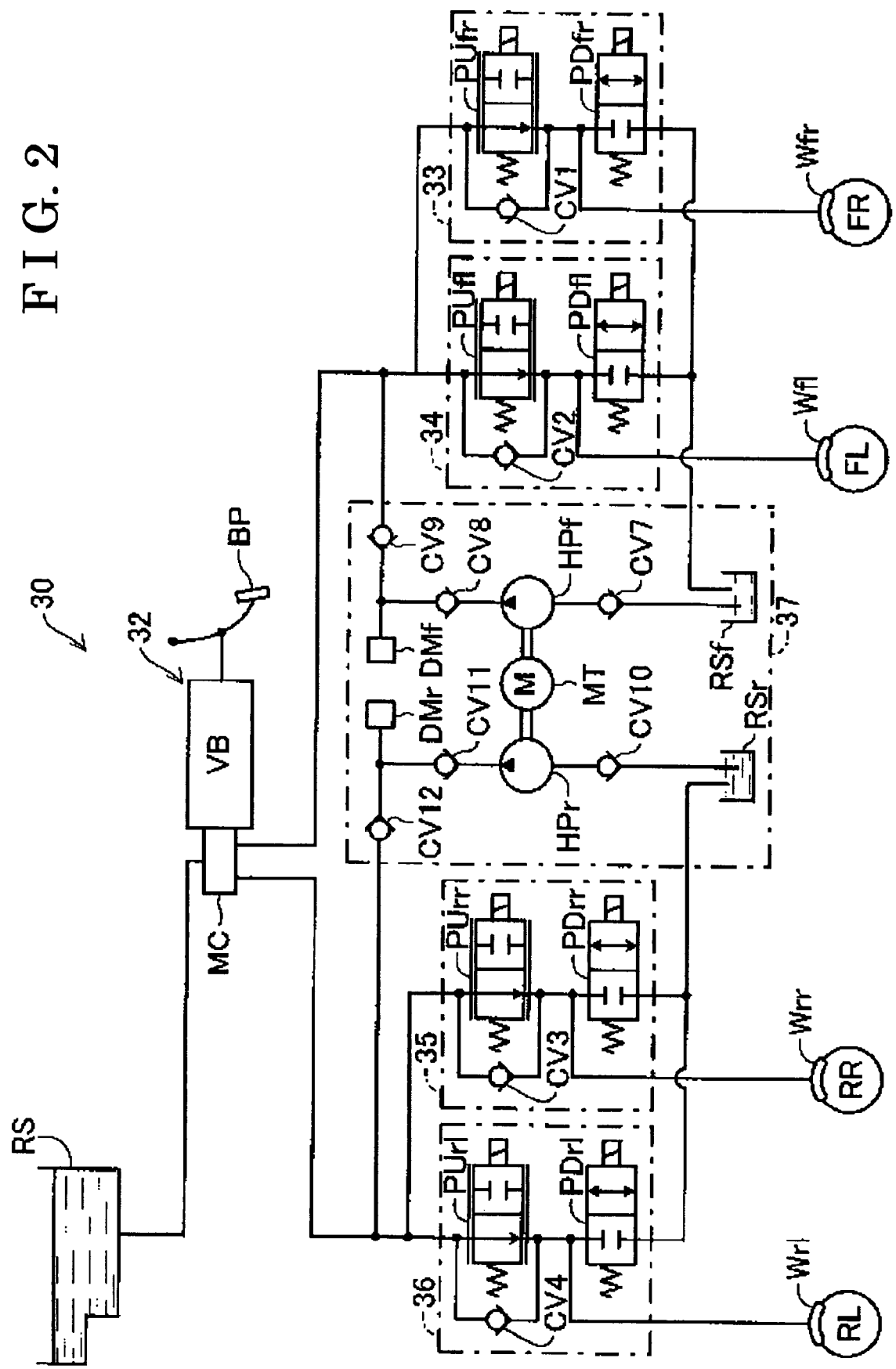
FIG. 2 is a schematic view illustrating a brake hydraulic pressure control unit illustrated in FIG. 1.

The brake apparatus 10 includes a brake hydraulic pressure control unit 30 for generating a braking force by brake fluid pressure at each wheel. Specifically, as illustrated in FIG. 2, the brake hydraulic pressure control unit 30 includes a brake fluid pressure-generating portion 32, a FR brake fluid pressure-adjusting portion 33, a FL brake fluid pressure-adjusting portion 34, a RR brake fluid pressure-adjusting portion 35, a RL brake fluid pressure-adjusting portion 36 and a brake fluid circulating portion 37. The brake fluid pressure-generating portion 32 generates brake fluid pressure responsive to an operation force at a brake pedal BP. The FR brake fluid pressure-adjusting portion 33 is controlled to adjust the brake fluid pressure provided to a wheel cylinder Wfr mounted on the wheel FR, the FL brake fluid pressure-adjusting portion 34 is controlled to adjust the brake fluid pressure provided to a wheel cylinder Wfl mounted on the wheel FL, the RR brake fluid pressure-adjusting portion 35 is controlled to adjust the brake fluid pressure provided to a wheel cylinder Wrr mounted on the wheel RR, and the RL brake fluid pressure-adjusting portion 36 is controlled to adjust the brake fluid pressure provided to a wheel cylinder Wrl mounted on the wheel RL.

The brake fluid pressure-generating portion 32 includes a vacuum booster VB actuated in accordance with the operation at the brake pedal BP and a master cylinder MC connected to the vacuum booster VB.

The master cylinder MC includes two ports; a first port and a second port. When the master cylinder MC is supplied with brake fluid from a reservoir RS, the master cylinder MC generates a first master cylinder hydraulic pressure corresponding to a brake pedal operation force boosted by the vacuum booster VB and outputs from the first port thereof. The master cylinder MC also generates a second master cylinder pressure corresponding to a brake pedal operation force boosted by the vacuum booster VB and outputs from the second port thereof, a second master cylinder pressure being approximately equal to the first master cylinder pressure.

The first port of the master cylinder MC is connected to an upstream side of the FR brake fluid pressure-adjusting portion 33 and an upstream side of the FL brake fluid pressure-adjusting portion 34. The second port of the master cylinder MC is, likewise, connected to an upstream side of the RR brake fluid pressure-adjusting portion 35 and an upstream side of the RL brake fluid pressure-adjusting portion 36.

The FR brake fluid pressure-adjusting portion 33 includes a pressure-increasing valve PUfr (corresponding to a first solenoid valve) and a pressure-reducing valve PDfr (corresponding to a second solenoid valve). According to the embodiment of the present invention, the pressure-increasing valve PUfr is a normally opened liner solenoid valve, and the pressure-reducing valve PDfr is a two-port and two-position switchover normally closed solenoid valve. The pressure-increasing valve PUfr is disposed at a first fluid passage connecting between the master cylinder MC and the wheel cylinder Wfr mounted on the front-rear wheel FR. The pressure-increasing valve PUfr is configured to vary between a closed state and an opened state in response to actual electric current applied thereto, so that a pressure difference between the master cylinder pressure and the wheel cylinder pressure may be adjusted and a fluid communication between the master cylinder MC and the wheel cylinder Wfr via the first fluid passage is interrupted when the pressure-increasing valve PUfr is applied with actual electric current at a value/amount equal to or greater than a predetermined electric current value/amount. The pressure-reducing valve PDfr is connected to the wheel cylinder Wfr at one port via a second fluid passage and is connected to a reservoir RSf at the other port. The pressure-reducing valve PDfr is configured to selectively be in a closed state or an opened state in response to actual electric current applied thereto. A fluid communication between the wheel cylinder Wfr and the reservoir RSf via the second fluid passage is interrupted when the pressure-reducing valve PDfr is in the closed state (a state corresponding to nonexcitation (OFF)) and is established when being in the opened state (a state corresponding to excitation (ON)).

A valve element of the pressure-increasing valve PUfr is normally applied with a force in an opened direction based upon a biasing force of a coil spring (not shown). Further, the valve element can be applied with a force in an opened direction based upon a pressure difference (actual pressure difference) between the master cylinder pressure and the wheel cylinder pressure and a force in a closed direction on the basis of a suction force increasing in proportion to a value of actual electric current applied to the pressure-increasing valve PUfr, a value of actual electric current applied to the pressure-increasing valve PUfr being a command electric current value Id and corresponding to a first electric current value.

Figure 3:
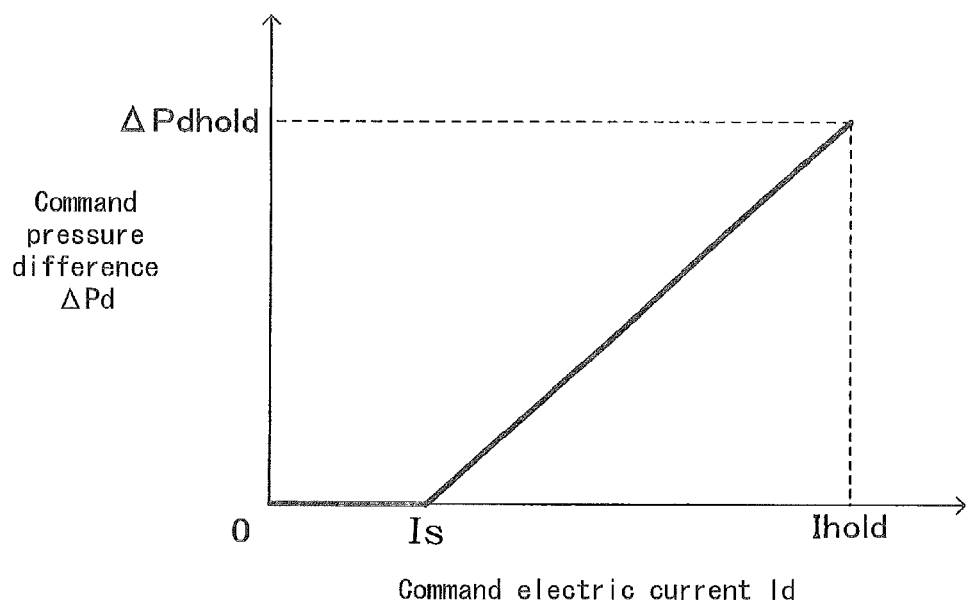
FIG. 3 is a diagram for explaining a relationship between a command electric current for a pressure-increasing valve in FIG. 2 and a command pressure difference.

As a result, as illustrated in FIG. 3, a command pressure difference ΔPd corresponding to the suction force is determined so as to increase in proportion to the command electric current value Id. Is in FIG. 3 indicates a value of electric current corresponding to the biasing force of the coil spring. The pressure-increasing valve PUfr is operated to be closed when the command pressure difference ΔPd is determined to be greater than the actual pressure difference (in other words, when the command electric current value Id is greater than an actual pressure difference corresponding electric current value), in order to interrupt a fluid communication between the upstream side of the FR brake fluid pressure-adjusting portion 33 and the wheel cylinder Wfr. On the other hand, the pressure-increasing valve PUfr is operated to be opened when the command pressure difference ΔPd is determined to be smaller than the actual pressure difference (in other words, when the command electric current value Id is smaller than the actual pressure difference corresponding electric current value), in order to establish a fluid communication between the upstream side of the FR brake fluid pressure-adjusting portion 33 and the wheel cylinder Wfr. Thus, the actual pressure difference is adjusted so as to become substantially equal to the command pressure difference ΔPd with the brake fluid at the upstream side of the FR brake fluid pressure-adjusting portion 33 flowing to the wheel cylinder Wfr.

In this way, as the command electric current value Id applied to the pressure-increasing valve PUfr gradually reduces from the actual pressure difference corresponding electric current value at the present time while the pressure-reducing valve PDfr is in the closed state, the actual pressure difference gradually reduces. As a result, a level of the brake fluid pressure (wheel cylinder pressure) inside the wheel cylinder Wfr rises smoothly and gradually. The operation in such circumstances is referred to as an operation under a linear pressure-increasing mode.

Meanwhile, when the pressure-reducing valve PDfr turns to the closed state with the pressure-increasing valve PUfr maintained at the closed state, the wheel cylinder pressure is maintained at a current pressure level independently from the level of hydraulic pressure at the upstream side of the FR brake fluid pressure-adjusting portion 33. The operation in such circumstances is referred to as an operation under a pressure-sustaining mode. When the pressure-increasing valve PUfr is maintained to be in a closed state and the pressure-reducing valve PDfr is maintained to be in an opened state, the brake fluid within the wheel cylinder Wfr is refluxed to the reservoir RSf, as a result, the wheel cylinder pressure is reduced. The control for reducing the wheel cylinder pressure is referred to as a pressure-reducing control mode.

As described above, the brake fluid pressure (wheel cylinder pressure) at the wheel cylinder Wfr is principally applied with the linear pressure-increasing control, the pressure-sustaining control and the pressure-reducing control in accordance with three control modes such as the linear pressure-increasing mode, the pressure-sustaining mode and the pressure-reducing mode. According to the embodiment, "a special linear pressure-increasing control" is executed instead of the linear pressure-increasing control.

The FL brake fluid pressure-adjusting portion 34, the RR brake fluid pressure-adjusting portion 35 and the RL brake fluid pressure-adjusting portion 36 are configured in the same manner as the FR brake fluid pressure-adjusting portion 33. Specifically, the FL brake fluid pressure-adjusting portion 34 includes a pressure-increasing valve PUfl and a pressure-reducing valve PDfl. The RR brake fluid pressure-adjusting portion 35 includes a pressure-increasing valve PUrr and a pressure-reducing valve PDrr, and the RL brake fluid pressure-adjusting portion 36 includes a pressure-increasing valve PUrl and a pressure-reducing valve PDrl.

The brake fluid circulating portion 37 includes a DC motor MT and two hydraulic pumps HPf and HPr, which are simultaneously driven by the DC motor MT. The hydraulic pump HPf suctions, via a check valve CV7, the brake fluid in the reservoir RSf, that is refluxed from the pressure-reducing valves PDfr and PDfl, and the suctioned brake fluid is supplied to the upstream sides of the FR brake fluid pressure-adjusting portion 33 and the FL brake fluid pressure-adjusting portion 34 via check valves CV8 and CV9.

In the same manner as the hydraulic pump HPf, the hydraulic pump HPr suctions, via a check valve CV 10, the brake fluid in the reservoir RSr refluxed from the pressure-reducing valves PDrr and PDrl, and the suctioned brake fluid is supplied to the upstream sides of the RR brake fluid pressure-adjusting portion 35 and the RL brake fluid pressure-adjusting portion 36 via check valves CV 11 and CV 12.

Going back to FIG. 1, the brake apparatus 10 further includes wheel speed sensors 41$fl$, 41$fr$, 41$rl$ and 41$rr$, each of which is mounted on each wheel in order to output a signal having a pulse every rotation of the wheel at a predetermined angle. The brake apparatus 10 further includes a brake switch 42 and an ECU 50 (electronic control unit). Specifically, the brake switch 42 selectively outputs an ON signal (High signal) or an OFF signal (Low signal) depending on the presence or absence of the operation of the brake pedal BP.

The ECU 50 is a microcomputer having a CPU 51, a ROM 52 in which routines (programs) executed by the CPU 51, tables (lookup tables or maps), a constant number and the like are memorized in advance, a RAM 53 in which data is temporally stored by the CPU 51 if necessary, a backup RAM 54 storing data while the power is supplied and retaining the data even when the power is not supplied and an interface 55 having an AD converter. These elements are connected by means of a bus.

The interface 55 is connected to the wheel speed sensor 41 and the brake switch 42, and signals are supplied from the wheel speed sensor 41 and the brake switch 42 to the CPU 51 via the interface 55. At the same time, in accordance with the command of the CPU 51, a drive signal is outputted to the solenoid valve (the pressure-increasing valve PU and/or the pressure-reducing valve PD) of the brake hydraulic pressure control unit 30 and/or the motor MT.

Each abbreviation "" added to the end of each parameter explains a comprehensive notation of "fl" indicating the front left wheel, "fr" indicating the front right wheel, "rl" indicating the rear left wheel or "rr" indicating the rear right wheel. For example, the pressure-increasing valve PU comprehensively indicates the front left wheel pressure-increasing valve PUfl, the front right wheel pressure-increasing valve PUfr, the rear left wheel pressure-increasing valve PUrl and the right rear wheel pressure-increasing valve PUrr.

Figure 4:
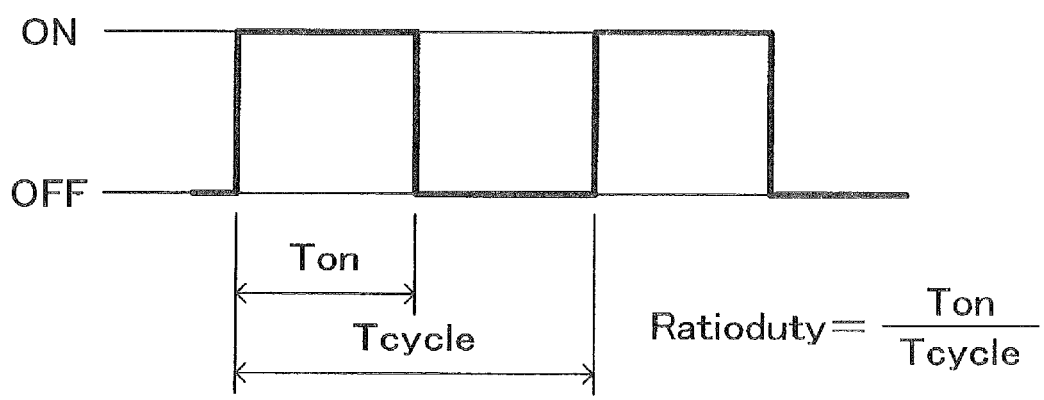
FIG. 4 is a view for explaining an electrically excitation pattern upon duty-controlling the command electric current in FIG. 3.

As illustrated in FIG. 4, the CPU 51 adjusts an average (effective) electric current (=command electric current value Id) by adjusting a percentage of an electrically exciting time Ton for the pressure-increasing valve PU per one control cycle time Tcycle(duty ratio Ratioduty=(Ton/Tcycle**)).

As mentioned above, the brake hydraulic pressure control unit 30 (CPU 51) executes an anti-skid control (ABS control) that prevents the wheel** from a possible excessive slipping that may occur in response to an operation at the brake pedal BP.

(Description of ABS Control)

Next, an ABS control executed by the brake apparatus 10 including the anti-skid control apparatus related to the embodiment of the present invention will be explained. The brake apparatus 10 starts the ABS control for the wheel** of which ABS control start condition is satisfied. In the ABS control, first of all, the pressure-reducing control is started and executed. When a predetermined pressure-sustaining start condition is satisfied during the pressure-reducing control, the pressure-sustaining control is started and executed following the pressure-reducing control. When a predetermined pressure-increasing control start condition is satisfied during the pressure-sustaining control, the special linear pressure-increasing control is executed following the pressure-sustaining control.

When the ABS control start condition is satisfied again while the special linear pressure-increasing control is being executed during the ABS control of this time, the currently executed special linear pressure-increasing control is completed and the ABS control for the next place is started successively to the ABS control of this time. Assuming that a period of time from where the ABS control start condition is established to where the ABS control start condition is established in the next place is referred to as one control cycle, generally, the ABS control, which includes, as one set, a combination of the pressure-reducing control, the pressure-sustaining control and the special linear pressure-increasing control, is executed multiple times successively over the plural control cycles, until a predetermined ABS control termination condition is satisfied. The ABS control executed by the brake apparatus 10 will be explained more specifically with reference to FIG. 5.

Figure 5:
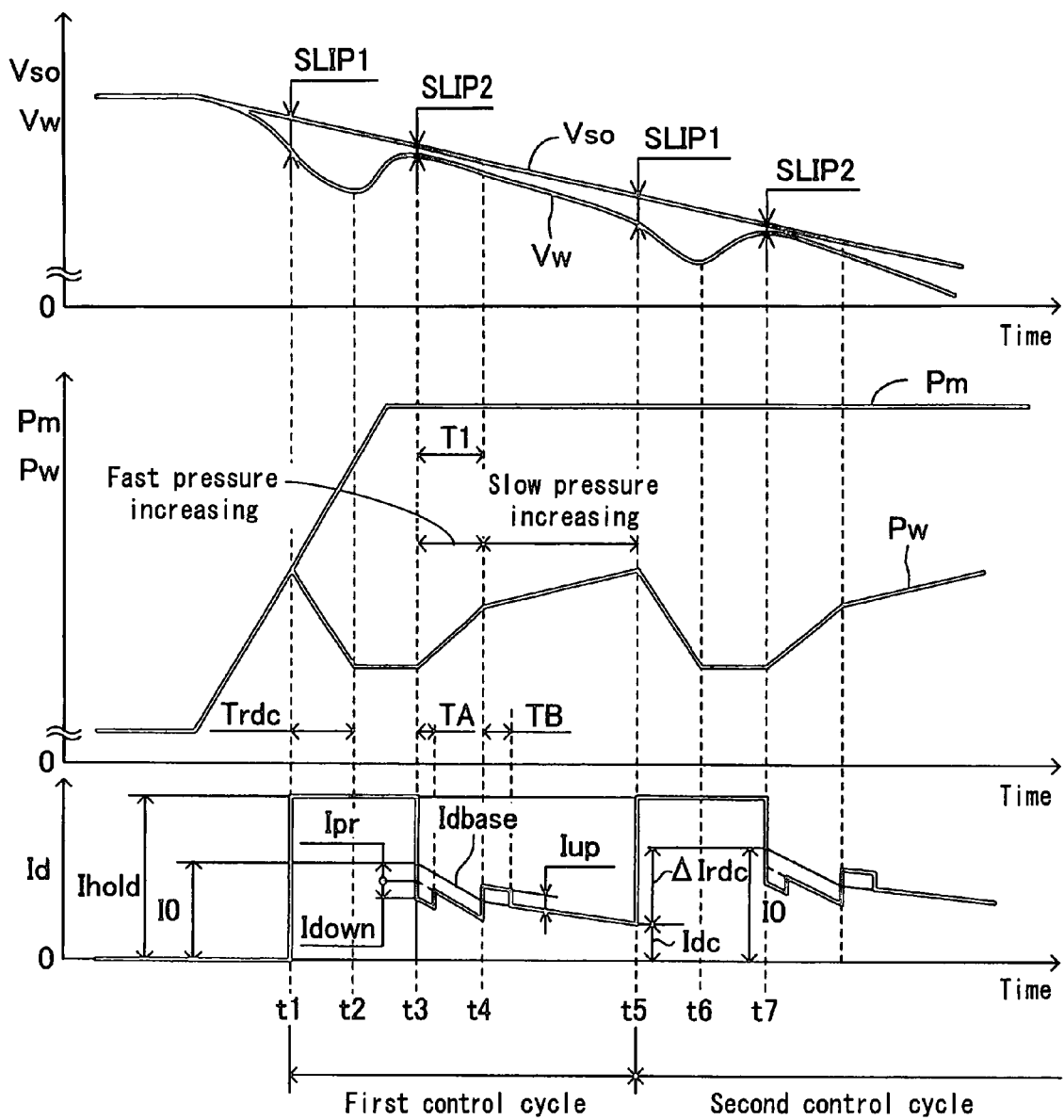
FIG. 5 is a time chart for explaining an example of changes in an estimated vehicle speed, a wheel speed, a master cylinder pressure, a wheel cylinder pressure and a command electric current value for the pressure-increasing valve as a normally opened linear solenoid valve.

FIG. 5 illustrates a time chart indicating an example of changes in a (estimated) vehicle speed Vso, a wheel speed Vw, a master cylinder pressure Pm, a wheel cylinder pressure Pw, and a command electric current value Id (i.e., the first electric current value) of the pressure-increasing valve PU** serving as the linear solenoid valve, when the ABS control is started and executed for a selected wheel by the brake apparatus 10 because of an operation of the brake pedal BP by a driver of a vehicle at a time point prior to a time tl.

In this case, as illustrated in FIG. 5, because the ABS control is not executed prior to the time t1, the wheel cylinder pressure Pw is equal to the master cylinder pressure Pm. At the time t1, i.e., when the wheel is to be locked in response to the operation at the brake pedal BP, the ABS control start condition is established and the brake apparatus 10 starts the pressure-reducing control (pressure-increasing valve PU: closed state (command electric current value Id: Ihold), pressure-reducing valve PD: opened state). As a result, the first control cycle is started and the wheel cylinder pressure Pw starts reducing. The ABS control start condition includes formulas SLIP>SLIP1 and |DVw**|>DVwref.

The SLIP is a slip amount at the wheel , and the slip amount SLIP is determined by a following formula (1). In the formula (1), Vso indicates an estimated speed of the vehicle. The DVw indicates a wheel acceleration of the wheel  (a time derivative of the wheel speed Vw). Each of the SLIP1 and the DVwref is a predetermined constant number.

$$SLIP^{} = Vso - Vw^{} \quad (1)$$

Then, at a time t2, the pressure-sustaining start condition is satisfied, and the brake apparatus 10 starts the pressure-sustaining control (pressure-increasing valve PU closed (command electric current value Id=Ihold), pressure-reducing valve PD: closed) following the pressure-reducing control. As a result, the wheel cylinder pressure Pw is sustained or maintained at a certain pressure level from the time t2. The pressure-sustaining control start condition is defined by the shift of the wheel acceleration DVw** from a negative value to a positive value.

In a time t3, the pressure-increasing control start condition is satisfied and the brake apparatus 10 executes "the special linear pressure-increasing control" as described above. In this embodiment, the pressure-increasing control start condition is defined by the formula SLIP**<SLIP2. A value of SLIP2 is smaller than a value of SLIP 1 and is a predetermined constant value. Hereinafter described is "the special linear pressure-increasing control".

In this special linear pressure-increasing control, a fast pressure-increasing control is implemented (from time t3 to time t4) for a fast pressure-increasing control period of time T1 (corresponding to a first pressure-increasing phase) from a time where the pressure-increasing control start condition is established. Sequentially to the fast pressure-increasing control, a slow pressure-increasing control is implemented (from time t4 to time t5, corresponding to a second pressure-increasing phase) until the ABS control start condition is established again (for the next). Setting of the fast pressure-increasing control period of time T1 is described below.

During the special linear pressure-increasing control, the command electric current value Id is set to a basic electric current value Idbase over the special linear pressure-increasing control period of time. The basic electric current value Idbase is set to the initial value 10 at the time t3 where the pressure-increasing control is initiated (i.e., electric current controlling means). The basic electric current value Idbase then reduces (from time t3 to time t4) linearly with a fast pressure-increasing gradient K1 (a positive value and corresponding to a first gradient) for the fast pressure-increasing control period of time T1. Sequentially, the basic electric current value Idbase reduces (from time t4 to time t5) linearly with a slow pressure-increasing gradient K2 (a positive value and corresponding to a second gradient). Settings of the initial value 10, the fast pressure-increasing gradient K1 and the slow pressure-increasing gradient K2 (<K1) are described later.

While the brake apparatus 10 maintains the pressure-reducing valve PD** in a closed state over the special linear pressure-increasing control, the brake apparatus 10 in principle sets the command electric current value Id to a value equal to the basic electric current value Idbase.

Further, the brake apparatus 10 changes the command electric current value Id in a direction to be reduced from the basic electric current value Idbase over the fast pressure-increasing control (from t3 to t4). Specifically, the command electric current value Id is controlled to be reduced by a first change amount Ipr (Id=Idbase−Ipr). The first change amount Ipr can be a constant value or a variable responsive to the first pressure-increasing gradient K1. Moreover, when the fast pressure-increasing gradient K1 is greater than a threshold value A (>0), the brake apparatus 10 changes the command electric current value Id in a direction to be further reduced during a first period of time TA from the initial time point of the fast pressure-increasing control (time t3). Specifically, the command electric current value Id is controlled to be reduced by a second change amount Idown (Id=Idbase−Ipr−Idown) over the first period of time TA. Settings of the first period of time TA, the first change amount Ipr and the second change amount Idown are described later. Accordingly, from the time t3, the wheel cylinder pressure Pw increases rapidly with a gradient approximately equal to a target wheel cylinder pressure-increasing gradient, a target gradient corresponding to the fast pressure-increasing gradient K1.

According to the embodiment, changing means includes means for changing the command electric current value Id in a direction to be reduced from the basis electric current value Idbase by the first change amount Ipr. The changing means can further include means for changing the command electric current value Id in a direction to be further reduced by the second change amount Idown.

Some effects are generated by reducing the command electric current value Id from the basic electric current value Idbase by the first change amount Ipr during the fast pressure-increasing control. Some effects are also generated by further reducing the command electric current value Id by the second change amount Idown over the first period of time TA that is located initially during the fast pressure-increasing control. These effects will be described later.

Further, in a situation where the fast pressure-increasing gradient K1 is greater than the threshold value A, i.e., where the command electric current value Id is further reduced by the second change amount Idown over the first period of time TA located at an early stage during the fast pressure-increasing control, the brake apparatus 10 changes the command electric current value Id in a direction to be increased from the basis electric current value Idbase over a second period of time TB (corresponding to a second period of time). Specifically, the brake apparatus 10 changes the command electric current value Id to be increased by a third change amount Iup from the basic electric current value Idbase (Id=Idbase+Iup). Settings of the second period of time TB and the third change amount Iup are described later. Accordingly, from time t4, the wheel cylinder pressure Pw is increased slowly with a gradient approximately equal to a wheel cylinder pressure-increasing gradient corresponding to the slow pressure-increasing gradient K2.

Here, the changing means can further include means for changing the command electric current value Id in a direction to be increased from the basic electric current value Idbase by the third change amount Iup. Some effects are generated by increasing the command electric current value Id from the basic electric current value Idbase by the third change amount Iup during the second period of time TB. These effects are described later. The special linear pressure-increasing control is implemented as described above.

At a time t5, the ABS control start condition is established or satisfied again and the brake apparatus 10 discontinues the slow pressure-increasing control being executed, i.e., discontinues "the special linear pressure-increasing control". Therefore, a second control cycle (a second ABS control) is initiated along with the termination of the first control cycle.

That is, the brake apparatus 10 executes the pressure-reducing control, in the same manner as a time period from the time t1 to time t2, during a time period starting from the time t5 and ending with a time t6 where the pressure-sustaining control start condition is satisfied and executes the pressure-sustaining control, in the same manner as a time period from the time t2 to time t3, during a time period starting from the time t6 to a time t7 where the pressure-increasing control start condition is satisfied. The brake apparatus 10 further executes the special linear pressure-increasing control, in the same manner as a time period from the time t3 to the time t5, from the time t7.

The initial values I0 for the basic electric current value Idbase, which is employed for the special linear pressure-increasing control of the second and following control cycle, is determined in accordance with the following formula (2). Here, Idc indicates a command electric current value Id at a time of starting the pressure-reducing control (t5) and corresponds to (should correspond to) an actual pressure difference corresponding electric current value that appears at the time of starting the pressure-reducing control (t5). ΔIrdc indicates a value of electric current that corresponds to an increment of an actual pressure difference increased due to the reduction in the wheel cylinder pressure Pw during the pressure-reducing control (from t5 to t6). ΔIrdc is obtained in accordance with the formula (3) and is hereinafter referred to as "a reduced pressure corresponding electric current value ΔIrdc ". In the formula (3), Trdc indicates a duration time in which the pressure reducing control is continued (e.g., from t5 to t6), and Krdc is a predetermined coefficient.

$$I0 = Idc + \Delta Irdc \quad (2)$$

$$\Delta Irdc = Krdc \cdot Trdc \quad (3)$$

In this way, the brake apparatus 10 repeatedly implements the ABS control which incorporates, as a set, a combination of the pressure-reducing control, the pressure-sustaining control and the special linear pressure-increasing control, unless the ABS control termination condition is satisfied. Described above is an outline of the ABS control implemented by the brake apparatus 10.

(Wheel Cylinder Pressure-increasing Delay and Preventing Wheel Cylinder Pressure from Overshooting)

As described in the "Background" of this specification, when the pressure control is shifted from the pressure-sustaining control to the pressure-increasing control (special linear pressure-increasing control), in the brake apparatus 10, a wheel cylinder pressure-increasing delay may occur for example because of a delay in opening the pressure-increasing valve PU**, at the early stage of the pressure-increasing control.

This "wheel cylinder pressure-increasing delay" is likely increased, as a target gradient for increasing the wheel cylinder pressure during the pressure-increasing control increases or is raised, i.e., as a gradient in changes (gradient) of the command electric current value Id increases or is raised according to the embodiment. Therefore, in the brake apparatus 10 which implements the fast pressure-increasing control over the fast pressure-increasing control time T1 that is located at the initial phase of the pressure-increasing control, "the wheel cylinder pressure-increasing delay" is apt to become large over the fast pressure-increasing control.

As described above, the brake apparatus 10 changes the command electric current value Id to be reduced from the basic electric current value Idbase by the first change amount Ipr during the fast pressure-increasing control (Id=Idbase−Ipr). Therefore, compared with the case where the command electric current value Id is set to be equal to the basic electric current value Idbase, the brake apparatus 10 of the embodiment facilitates the movement of the valve element of the pressure-increasing valve PU in an opened direction. As a result, a delay in opening the pressure-increasing valve PU is restrained or prevented and a delay in increasing the wheel cylinder pressure is restrained or prevented.

Figure 6:
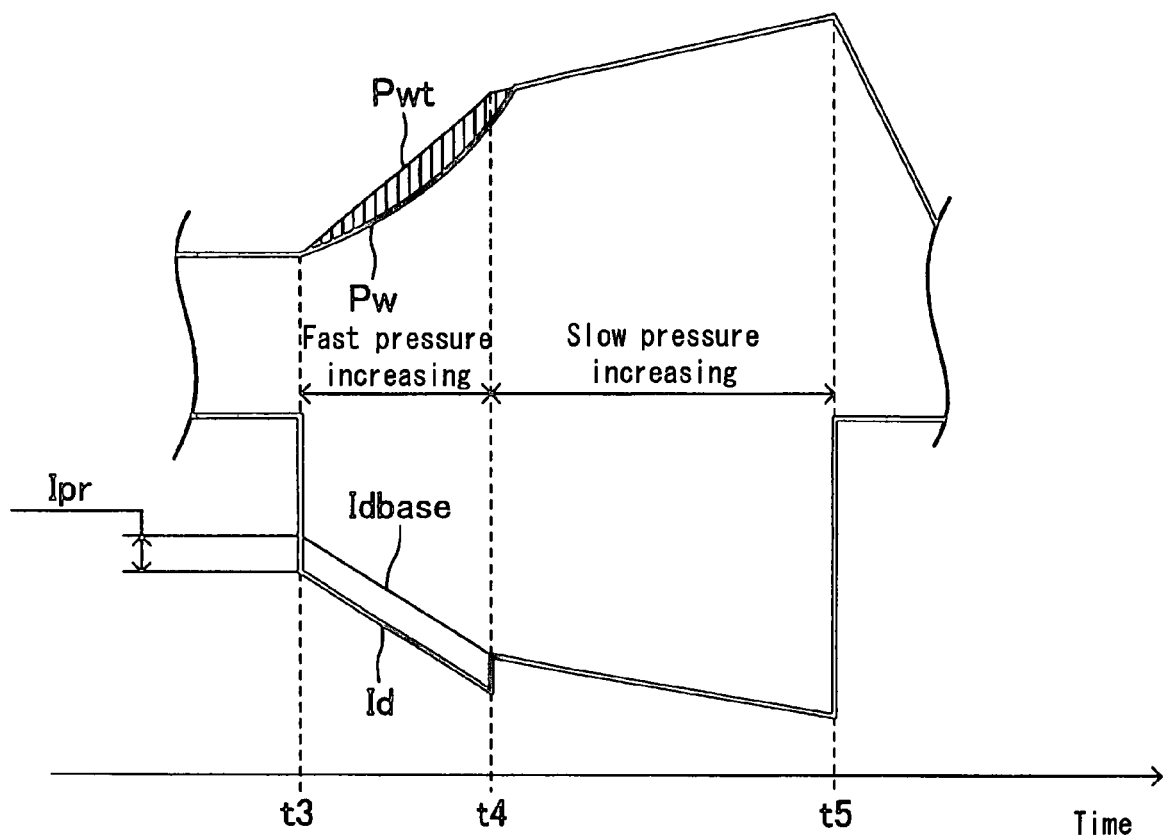
FIG. 6 is a timechart for explaining a case where a wheel cylinder pressure-increasing delay occurs even when the command electric current value is reduced by a first change amount from a basic electric current value over a fast pressure-increasing control, FIG. 6 corresponding with FIG. 5.

However, as illustrated in FIG. 6, the inventors have verified that there is a case where "the wheel cylinder pressure-increasing delay" becomes large even if the command electric current value Id is changed to be reduced by the first change amount Ipr from the basic electric current value Idbase during the fast pressure-increasing control in a circumstance where the fast pressure-increasing gradient K1, which is a gradient of changes in the command electric current value Id during the fast pressure-increasing control, is relatively large.

The times t3, t4 and t5 in FIG. 6 correspond to the times t3, t4 and t5 in FIG. 5, respectively. Likewise, the times t3, t4 and t5 in FIGS. 7 and 8 correspond to them, respectively. In FIG. 6 (likewise, in FIGS. 7 and 8), Pwt (depicted with a thin line) is a wheel cylinder pressure (a target value of wheel cylinder pressure) corresponding to the basic electric current value Idbase. In FIG. 6 (likewise, in FIGS. 7 and 8), a shaded area represents "the wheel cylinder pressure-increasing delay".

Figure 7:
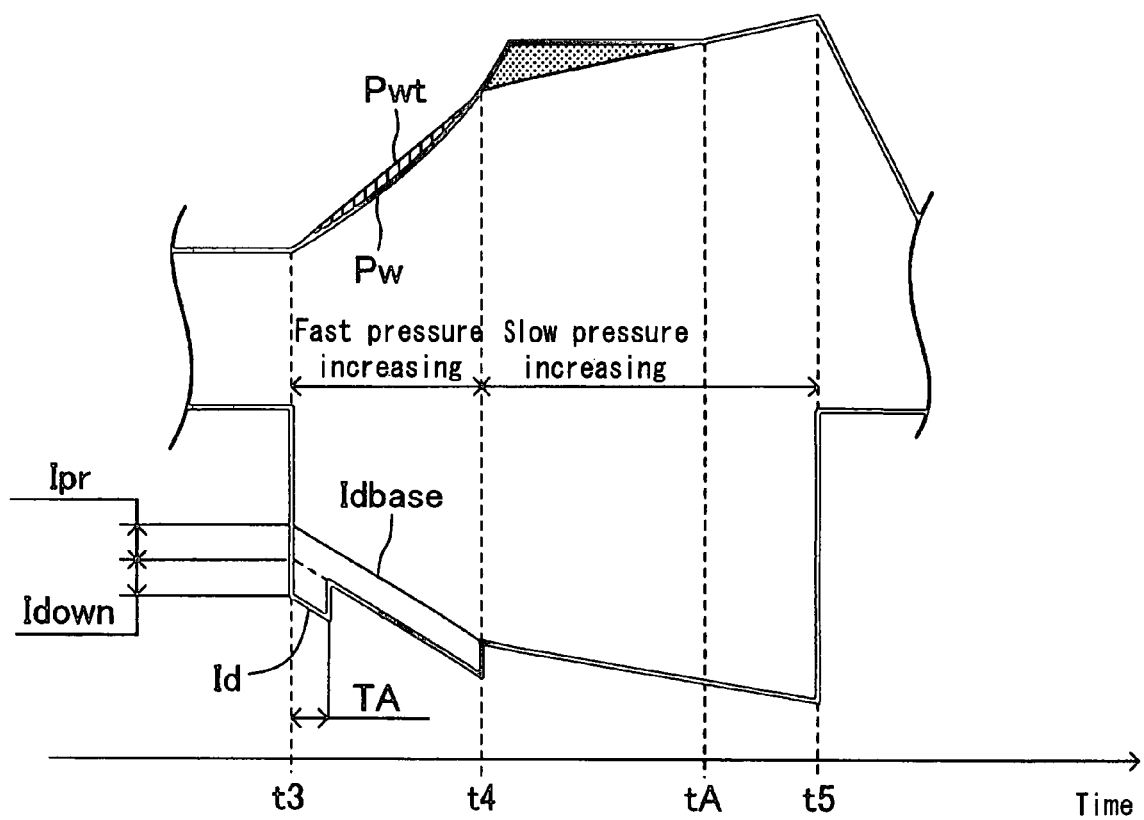
FIG. 7 is a time chart for explaining a case where the command electric current value is further reduced by a second change amount over an initial period of time during the fast pressure-increasing control, FIG. 7 corresponding with FIG. 5.

In the light of the foregoing, in the brake apparatus 10 of the embodiment, as illustrated in FIG. 7, when the fast pressure-increasing gradient K1 is greater than the threshold value A, the command electric current value Id is changed to be further reduced by the second change amount Idown over the first period of time TA that is located initially during the fast pressure-increasing control (Id=Idbase−Ipr−Idown). Accordingly, the brake apparatus 10 further facilitates the movement of the valve element of the pressure-increasing valve PU in an opened direction especially at the initial phase of the fast pressure-increasing control. Here, a delay in opening the pressure-increasing valve PU is restrained reliably. As a result, as illustrated in FIG. 7, the wheel cylinder pressure-increasing delay becomes less.

However, as illustrated in FIG. 7, once the command electric current value Id is changed to be further reduced by the second change amount Idown over the first period of time TA that is located at an early stage of the fast pressure-increasing control, there is a possibility of an increase in an overshoot of the wheel cylinder pressure at an early or initial phase of the slow pressure-increasing control. The area covered with small dots in FIG. 7 represents an overshooting amount of the wheel cylinder pressure, and likewise in FIG. 8.

Where the overshoot of the wheel cylinder pressure is generated, the actual pressure difference is less than the command pressure difference ΔPd. Therefore, the pressure-increasing valve PU** is maintained into a closed state from where the increasing of the overshoot of the wheel cylinder pressure is finished to where the actual pressure difference becomes equal to the command pressure difference ΔPd. That is, the wheel cylinder pressure Pw is maintained to be greater than the target wheel cylinder pressure value Pwt during this period of time. A time tA in FIG. 7 represents a time point where the actual pressure difference becomes equal to the command pressure difference ΔPd.

As described above, the period of time of overshooting of the wheel cylinder pressure becomes large, as the overshooting amount of the wheel cylinder pressure is increased. Therefore, it is necessary to restrain overshooting of the wheel cylinder pressure.

Figure 8:
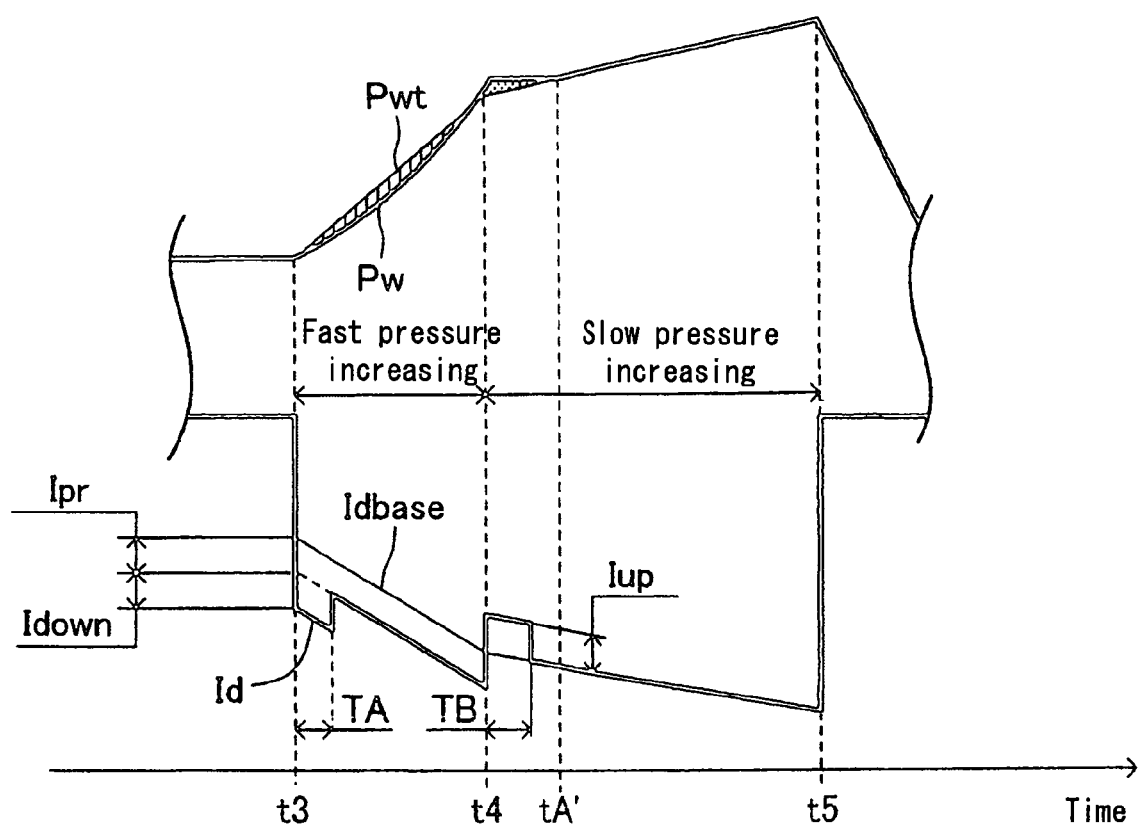
FIG. 8 is a time chart explaining a case where the command electric current value is further reduced by the second change amount over the initial period of time during the fast pressure-increasing control and increased from the basic electric current value by a third change amount over an initial period of time during a slow pressure-increasing control, FIG. 8 corresponding with FIG. 5.

In light of the foregoing, as illustrated in FIG. 8, in the brake apparatus 10 of the embodiment, when the command electric current value Id is further reduced by the second change amount Idown over the first period of time TA located initially during the fast pressure-increasing control, i.e., when the fast pressure-increasing gradient K1 is greater than the threshold value A, the command electric current value Id is changed to be increased by the third change amount Iup over the second period of time TB (Id=Idbase +Iup). Therefore, the valve body of the pressure-increasing valve PU** is easily moved to be closed at the initial phase of the slow pressure-increasing control. As a result, it turns to be hard for the wheel cylinder pressure Pw to increase and the overshoot of the wheel cylinder pressure becomes less, as illustrated in FIG. 8.

As described above, a time point (tA' in FIG. 8), where the actual pressure difference matches the command pressure difference ΔPd, is accelerated or advanced than the time point (tA in FIG. 7), and the state, where the wheel cylinder pressure is overshooting, is abbreviated. As a result, as illustrated in FIG. 8, even when the fast pressure-increasing gradient K1 is greater than the threshold value A, it is possible to approximately match the wheel cylinder pressure Pw during the pressure-increasing control with the wheel cylinder pressure target value Pwt.

(Actual Operation)

Next, an operation of the brake apparatus 10 for a vehicle will be explained, in accordance with flowcharts illustrated in FIGS. 9 through 13 indicating routines executed by the CPU 51 of the ECU 50. The routines explained in FIGS. 9 to 13 are each executed for each wheel of the vehicle.

Figure 9:
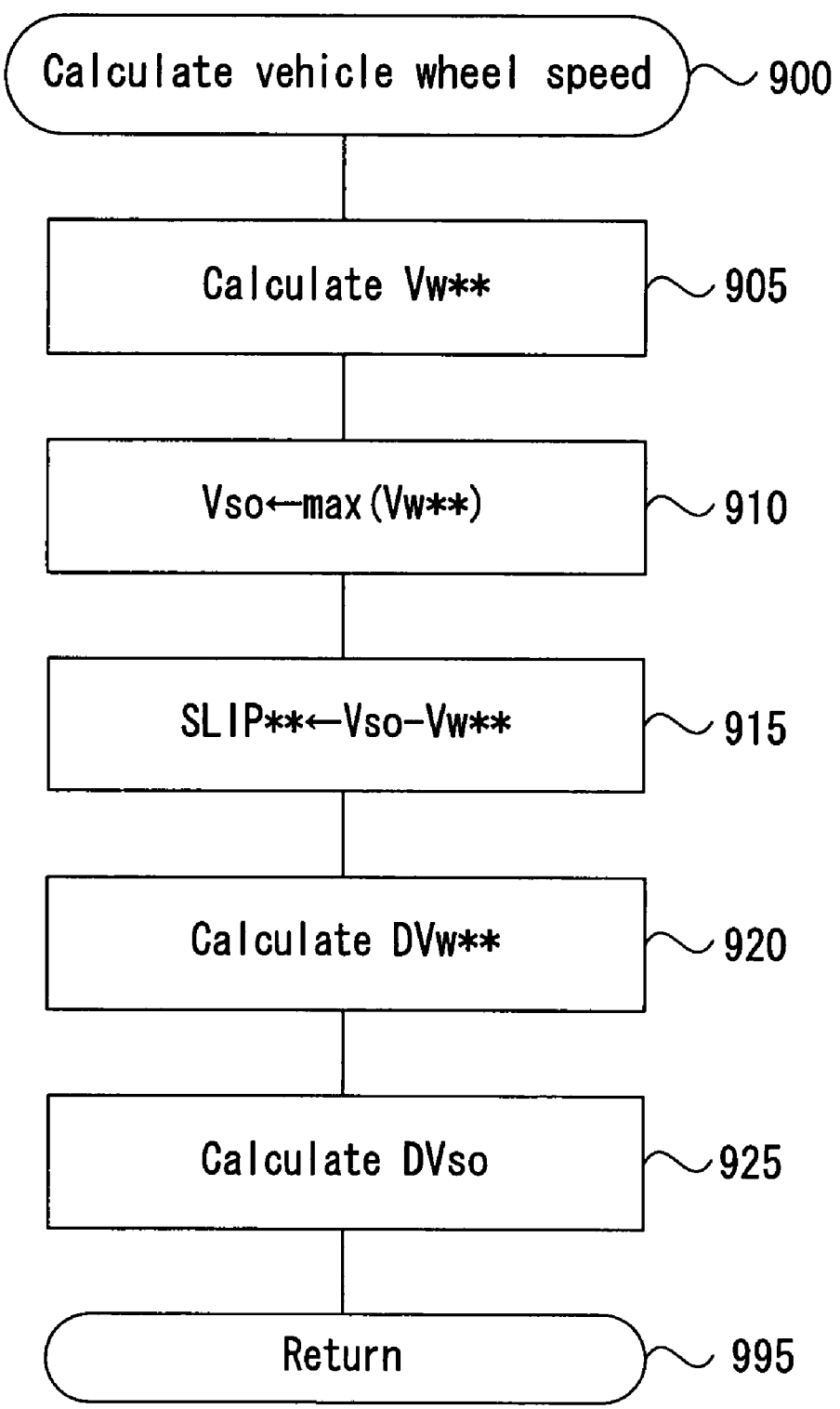
FIG. 9 is a flowchart for explaining a routine for calculating a vehicle speed and so on and executed by a CPU in FIG. 1.

The CPU 51 repeatedly implements a routine illustrated in FIG. 9, in order to calculate a wheel speed or the like, every predetermined elapsed time. That is, when the predetermined elapsed time passes, the CPU 51 starts a process in Step 900 and proceeds to Step 905. In Step 905, a wheel speed Vw for the wheel  is calculated. Specifically, the CPU 51 calculates the wheel speed Vw on the basis of an interval of pulse included in a signal outputted by the wheel speed sensor 41.

Then, the CPU 51 proceeds to Step 910. In Step 910, a maximum value of the wheel speed Vw is calculated as an estimated vehicle speed Vso. At this point, an average value of the wheel speeds Vw may be calculated as the vehicle speed Vso. Then, the CPU 51 proceeds to Step 915. In Step 915, a slip amount SLIP at the wheel  is calculated on the basis of the formula (1) by use of the estimated vehicle speed Vso calculated in Step 910 and the wheel speed Vw** calculated in Step 905.

The CPU 51 further proceeds to Step 920. In Step 920, a wheel acceleration DVw at the wheel  is calculated by use of a following formula (4), a wheel acceleration DVw being a time derivative of the wheel speed . In the formula (4), Vw1 indicates the wheel speed Vw calculated in Step 905 when the current routine was previously executed, and Δt indicates the aforementioned predetermined elapsed time (an execution cycle of the current routine by the CPU 51).

$$DVw^{}=(Vw^{}-Vw1^{**})/\Delta t \tag{4}$$

Then, the CPU 51 proceeds to Step 925. In Step 925, a vehicle deceleration Dvso is calculated in accordance with the formula (5). The vehicle deceleration Dvso is a value with the sign (+, −) reversed from the sign of the time derivative of the vehicle speed Vso. The CPU 51 proceeds to Step 995. In Step 995, the current routine is temporarily terminated. Vso1 in the formula (5) is the vehicle speed Vso calculated in Step 910 when the current routine was previously executed.

$$DVso=(Vso-Vso1)/\Delta t \tag{5}$$

Figure 10:
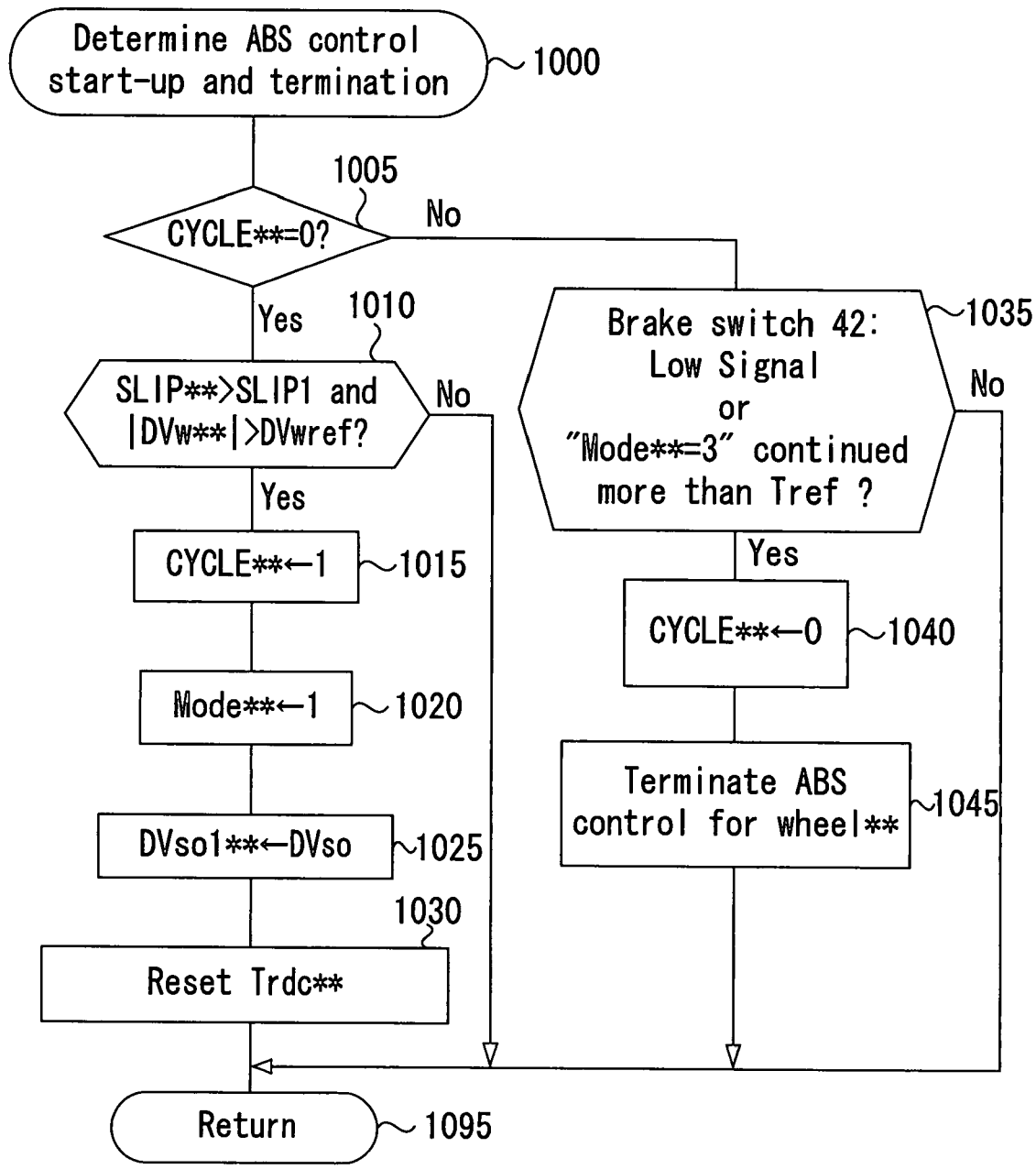
FIG. 10 is a flowchart for explaining a routine for determining a start and a termination of an ABS control executed by the CPU in FIG. 1.

Further, The CPU 51 repeats a routine for determining a start and a termination of the ABS control in FIG. 10 every predetermined elapsed time. Thus, in the predetermined elapsed time, the CPU 51 starts the routine in FIG. 10 from Step 1000 and proceeds to Step 1005. In Step 1005, the CPU 51 judges whether or not a variable CYCLE  is "0". When the value of the variable CYCLE  is "0", the CPU 51 determines that the ABS control is not executed at the wheel * and when the value of the variable CYCLE  is "1", the CPU 51 determines that the first ABS control has been executed. Further, when the value of the variable CYCLE  is "2", the CPU 51 determines that the second or following ABS control has been executed.

Assuming that the ABS control has not been executed for the wheel * and the ABS control start condition has not been established, because the variable CYCLE  is "0", an allowable answer "Yes" is obtained in Step 1005 and the CPU 51 proceeds to Step 1010. In Step 1010, the CPU 51 judges whether or not the ABS control start condition is satisfied. Here, A last or updated value obtained in Step 915 is employed as SLIP, and a last or updated value obtained in Step 920 is employed as DVw**.

At this moment, because the ABS control start condition for the wheel ** is not established, a negative answer "No" is obtained in Step 1010. The program then proceeds to Step 1095 and this routine in FIG. 10 is temporarily terminated. Unless the ABS control start condition is satisfied, Steps 1000, 1005 and 1010 are implemented repeatedly.

Assuming the ABS control start condition for the wheel is satisfied in response to the operation at the brake pedal BP in the above described circumstances (see tl in FIG. 5), an affirmative answer "Yes" is obtained in 1010 and the program proceeds to Step 1015. In Step 1015, the CPU 51 changes the value of the variable CYCLE from "0" to "1". In Step 1020, the CPU 51 sets the value of a variable Mode to "1". Here, When the value of the variable Mode is "1", the CPU 51 determines that the pressure-reducing control is executed at the wheel. When the value of the variable Mode is "2", the CPU 51 determines that the pressure-sustaining control is executed at the wheel. When the value of the variable Mode is "3", the CPU 51 determines that the pressure-increasing control (i.e., the special linear pressure-increasing control) is executed at the wheel**.

The program then proceeds to Step 1025. In Step 1025, the CPU 51 memorizes, as a pressure-reducing control start-timing vehicle deceleration DVsol, the vehicle deceleration DVso at that present moment, (i.e., at a time of starting the pressure-reducing control) updated in step 925 in FIG. 9. In Step 1030, the CPU 51 resets the duration time Trdc. The CPU 51 then proceeds to Step 1095 so as to temporarily terminate this routine illustrated in FIG. 10**.

Here, the duration time Trdc is a period of time elapsed from the time of starting the pressure-reducing control (see time t1 in FIG. 5**).

After the above, a negative answer "No" is obtained in Step 1005, and the program proceeds to Step 1035. In Step 1035, the CPU 51 monitors whether the ABS control termination condition is satisfied. The ABS control termination condition is satisfied when the brake switch 42 outputs a Low signal, i.e., when a driver stops an operation at the brake pedal BP. Alternatively, the ABS control termination condition is satisfied when the state of Mode**=3 is continued more than a predetermined period of time Tref.

Now, it is immediately after the establishment of the ABS control start condition. Therefore, the CPU 51 judges a negative answer "No" in Step 1035. After that, unless the ABS control termination condition is established in Step 1035, the CPU 51 executes repeatedly Steps 1000, 1005 and 1035. While the aforementioned process is being repeated, the CPU 51 executes the ABS control in sequence from the first control cycle for the wheel by implementing the routines illustrated in FIGS. 11, 12 and 13**.

Figure 11:
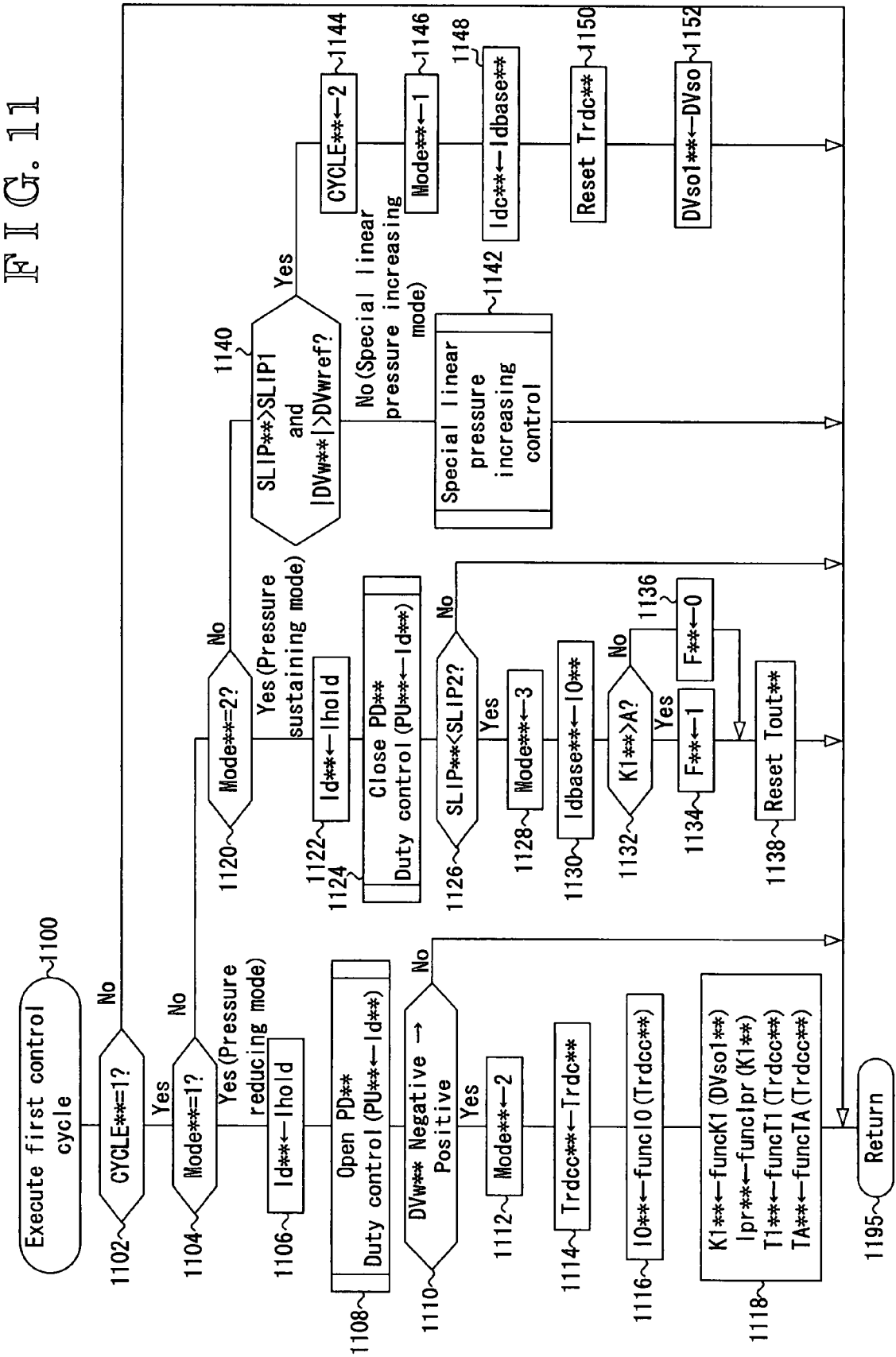
FIG. 11 is a flowchart for explaining a routine for executing the ABS control for a first control cycle by the CPU in FIG. 1.

The CPU 51 repeatedly executes the program illustrated in FIG. 11 so as to execute the first control cycle on every predetermined elapsed time. In the predetermined elapsed time, the CPU 51 starts the program in FIG. 11 from Step 1100 and proceeds to Step 1102. In Step 1102, the CPU 51 judges whether the value of the variable CYCLE is "1". When a negative answer "No" is obtained in Step 1102, the program proceeds to Step 1195 so as to temporarily terminate this routine in FIG. 11**.

Assuming that the present moment is immediately after the establishment of the ABS control start condition and immediately after the value of the variable CYCLE was changed from "0" to "1" (see t1 in FIG. 5), an affirmative answer "Yes" is obtained in Step 1102 and the program proceeds to Step 1104. In step 1104, the CPU 51 judges whether the value of the valuable Mode is "1".

At the present moment, the value of the valuable Mode is now "1" by the process in Step 1020 in FIG. 10, an affirmative answer "Yes" is obtained in Step 1104 and the program proceeds to Step 1106. In Step 1106, the CPU 51 sets the command electric current value Id of the pressure-increasing valve PU for the wheel to a closed valve holding electric current value Ihold (a predetermined electric current value). In step 1108, the CPU 51 operates the pressure-reducing valve PD for the wheel to the opened state and duty-controls the actual electric current applied to the pressure-increasing valve PU to the command electric current Id (=Ihold). Accordingly, the pressure-reducing control for the wheel is started and executed.

The program then proceeds to Step 1110 and the CPU 51 judges whether the wheel acceleration DVw** of the wheel* is changed from a negative value to a positive value, i.e., whether the value of the wheel speed Vw turns to a minimum value, and i.e., whether the pressure-sustaining start condition is satisfied. The last or updated value calculated in Step 920 in FIG. 9, is employed as the DVw. The present moment is immediately after the starting of the pressure-reducing control so that the value of the wheel speed Vw is not the minimum value. Therefore, a negative answer "No" is obtained in Step 1110 and the program proceeds to Step 1195. The CPU 51 repeatedly implements Steps 1100 to 1110 until the pressure-sustaining start condition is satisfied. As a result, the pressure-reducing control for the wheel is continued.

When the value of the wheel speed Vw turns to the minimum value in the predetermined elapsed time (see t2 in FIG. 5), an affirmative answer "Yes" is obtained in Step 1110. The CPU 51 proceeds to Step 1112 and changes the value of the valuable Mode from "1" to "2".

In Step 1114, the CPU 51 memorizes, as a pressure-reducing control duration time Trdcc, the duration time Trdc at that moment (here, the pressure-reducing control duration time for the first control cycle). In Step 1116, the CPU 51 obtains an initial value I0 in accordance with a function funcI0 and the pressure-reducing control duration time Trdcc. The function funcI0 is employed so as to calculate the initial value I0 for the basic electric current value Idbase that uses "Trdcc" as a parameter. The initial value 10 is an estimated value of an electric current value corresponding to an actual pressure difference at a time of starting the pressure-increasing control. The actual pressure difference at a time of starting the pressure-increasing control is correlated with the pressure-reducing control duration time Trdcc.

In Step 1118, the CPU 51 calculates the fast pressure-increasing gradient K1 (>0), the first change amount Ipr (>0), the fast pressure-increasing control time T1 (>0), and the first period of time TA (>0). More specifically, the fast pressure-increasing gradient K1 is obtained based upon the vehicle deceleration Dvso1 at a time of starting the pressure-reducing control obtained in Step 1025 in FIG. 10 and a function funcK1. The first change amount Ipr is obtained based upon the fast pressure-increasing gradient K1 and a function funcIpr. The fast pressure-increasing control time T1 is obtained based upon the pressure-reducing control duration time Trdcc obtained in Step 1114 in FIG. 11 and a function funcT1. The first period of time TA is obtained based upon the pressure-reducing control duration time Trdcc and a function funcTA.

Therefore, the fast pressure-increasing gradient K1 becomes large as the vehicle deceleration Dvso1 at a time of starting the pressure-reducing control is increased. This attributes to the fact that an amount of wheel cylinder pressure reduced during the pressure-reducing control rises as the vehicle deceleration Dvso1 at a time of starting the pressure-reducing control is increased, so that it is necessary to increase a gradient for increasing the wheel cylinder pressure during the pressure-increasing control. Further, the first change amount Ipr becomes large as the fast pressure-increasing gradient K1** is increased. This attributes to the fact that a delay in increasing the wheel cylinder pressure becomes large as the gradient for increasing the wheel cylinder pressure is increased.

Still further, the fast pressure-increasing control time T1 becomes longer as the pressure-reducing control duration time Trdcc extends. According to the embodiment, the fast pressure-increasing control time T1 is defined from the time of starting the pressure-increasing control to where a wheel cylinder pressure of the wheel is compensated or recovered by a predetermined percentage (e.g., 70%) out of the amount of the wheel cylinder pressure reduced during the pressure-reducing control. This period of time defined as described above becomes long as the pressure-reducing control duration time Trdcc** extends.

Moreover, the first period of time TA becomes long as the pressure-reducing control duration time Trdcc extends. This attributes to the fact that an amount of operation fluid required to increase the wheel cylinder pressure at the wheel is increased as the pressure-reducing control duration time Trdcc extends, so that a delay in increasing the wheel cylinder pressure is increased.

Here, because the valuable Mode* is already "2", a negative answer "No" is obtained in Step 1104 and the CPU 51 proceeds to Step 1120. In Step 1120, the CPU 51 judges whether the value of the valuable Mode is "2". At this moment, because the valuable Mode is "2", an affirmative answer "Yes" is obtained in Step 1120. The program proceeds to Step 1122 and the CPU 51 assigns the closed valve holding electric current value Ihold to the command electric current value Id of the pressure-increasing valve PU.

In Step 1124, the CPU 51 controls the pressure-reducing valve PD to be in a closed state and duty-controls an amount of actual electric current applied to the pressure-increasing valve PU to the command electric current value Id (=Ihold). Accordingly, the pressure-sustaining control for the wheel** is started and executed.

In Step 1126, the CPU 51 judges whether the slip amount SLIP for the wheel is smaller than a predetermined slip amount SLIP2, in other words judges whether the pressure-increasing control start condition is satisfied. The last or updated value obtained in Step 915 in FIG. 9, is employed as the slip amount SLIP**.

As of now, because it is immediately after the starting of the pressure-sustaining control, the slip amount SLIP is greater than the predetermined slip amount SLIP2. A negative answer "No" is hence obtained in Step 1126 and the program proceeds to Step 1195. Until the pressure-increasing control start condition for the wheel is established, the CPU 51 repeatedly implements Steps 1100, 1102, 1104, 1120, 1122, 1124 and 1126. As a result, the pressure-sustaining control for the wheel** is continued.

When the slip amount SLIP becomes less than the predetermined slip amount SLIP2 in the predetermined elapsed time (see t3 in FIG. 5), an affirmative answer "Yes" is obtained in Step 1126. The program then proceeds to Step 1128 and the CPU 51 changes the valuable Mode from "2" to "3".

Subsequently, the CPU 51 proceeds to Step 1130 so as to prepare for the pressure-increasing control (specifically special linear pressure-increasing control) to be executed next. In Step 1130, the CPU 51 sets the initial value I0 stored in Step 1116 to the basic electric current value Idbase.

In Step 1132, the CPU 51 judges whether the fast pressure-increasing gradient K1 set in Step 1118, is greater than the threshold value A. When an affirmative answer "Yes" is obtained in Step 1132, the program proceeds to Step 1134 and the CPU 51 sets a flag F at "1". When a negative answer "No" is obtained in Step 1132, the program proceeds to Step 1136 and the CPU 51 sets a flag F** at "0".

In Step 1138, the CPU 51 resets an elapsed time Tout. Here, "Tout" is clocked by a predetermined timer embedded in the ECU 50 and represents a duration time of the special linear pressure-increasing control that is in execution.

As a result, because the value of the valuable Mode is "3", a negative answer "No" is obtained in Step 1120, and the program proceeds to Step 1140. In Step 1140, the CPU 51 judges whether the ABS start condition, which is the same as the condition in Step 1010 in FIG. 10**, is satisfied again, i.e., judges whether a second control cycle is started.

As of now, it is immediately after the starting of the special linear pressure-increasing control, the ABS control start condition is not satisfied. A negative answer "No" is hence obtained in Step 1140 and the program proceeds to Step 1142. In Step 1142, the CPU 51 starts a sub-routine for executing "the special linear pressure-increasing control" illustrated in FIG. 12.

Figure 12:
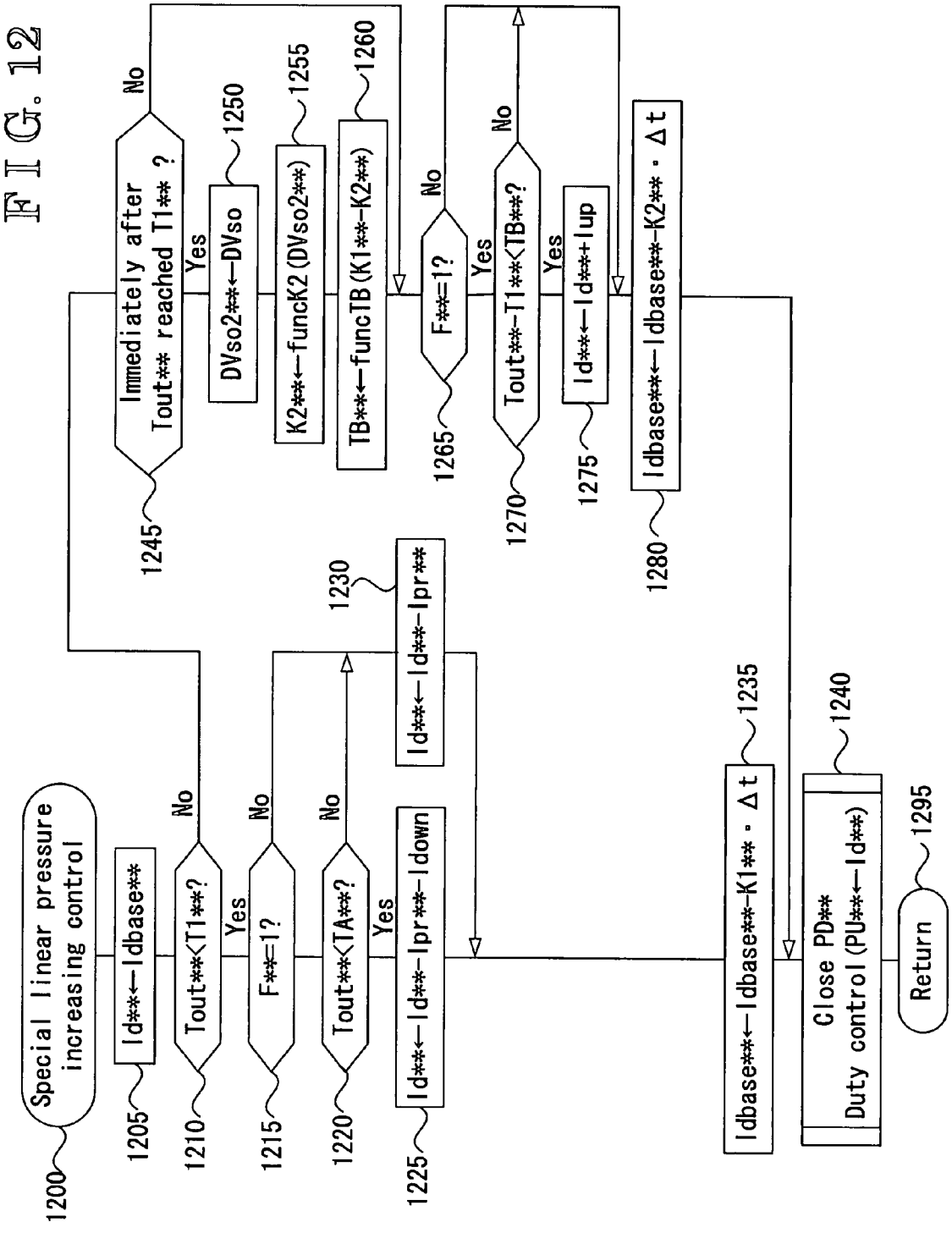
FIG. 12 is a flowchart for explaining a routine for executing a special linear pressure-increasing control by the CPU in FIG. 1.

The special linear pressure-increasing control is started from Step 1200 in FIG. 12. In Step 1205, the CPU 51 assigns the basic electric current value Idbase to the command electric current value Id of the pressure-increasing valve PU. At the moment, the value (initial value I0) set in Step 1130 in FIG. 11 is employed as the basic electric current value idbase. From the next, the value updated in Step 1235 or Step 1280 is employed.

In Step 1210, the CPU 51 judges whether the elapsed time Tout is less than the fast pressure-increasing control time T1. As of now, it is immediately after the starting of the pressure-increasing control, the elapsed time Tout is less than the fast pressure-increasing control time T1. Therefore, an affirmative answer "Yes" is obtained in Step 1210, and in Step 1215, the CPU 51 judges whether the flag F** is "1".

Described below is the case where the flag F is "1"(i.e., K1>A) in Step 1215. In this case, an affirmative answer "Yes" is obtained in Step 1215 and the program proceeds to Step 1220. In Step 1220, the CPU 51 judges whether the elapsed time Tout is less than the first period of time TA. As of now, an affirmative answer "Yes" is obtained in Step 1220, and the program proceeds to Step 1225. In Step 1225, the CPU 51 reduces the command electric current value Id from the value at the present time (=Idbase) by an amount of "Ipr**+Idown". According to the embodiment, the second change amount Idown is a variable responsive to the amount of wheel cylinder pressure reduced during the pressure-reducing control.

Subsequently, in Step 1235, the CPU 51 updates the basic electric current value Idbase to a value that is smaller than a present electric current value by a value K1·Δt. The value K1·Δt corresponds to a reduced amount of the basic electric current value Idbase per execution cycle of this routine during the fast pressure-increasing control.

In Step 1240, the CPU 51 operates the pressure-reducing valve PD into a closed state, and duty-controls an amount of actual electric current applied to the pressure-increasing valve PU to the command electric current value Id. Here, the command electric current value Id is a value updated in Step 1225 or in Step 1230. As of now, the command electric current value Id is a value determined in Step 1225**.

As described above, the special linear pressure-increasing control for the wheel is started and executed. The program then proceeds to Step 1195 in FIG. 11 via Step 1295 in FIG. 12 and Step 1142 in FIG. 11 and the CPU 51 temporarily terminates the routine illustrated in FIG. 11**.

The aforementioned steps are repeatedly implement until the elapsed time Tout reaches the first period of time TA in a situation where the ABS control start condition has not been established. As a result, in Step 1235, the basic electric current value Idbase is reduced linearly with the fast pressure-increasing gradient K1. Further, in Step 1225, the command electric current value Id is determined at a value obtained by subtracting the amount "Ipr and Idown" from the basic electric current value Idbase (see t3 and after in FIG. 5**).

Once the elapsed time Tout reaches the first period of time TA, a negative answer "No" is obtained in Step 1220. The program then proceeds to Step 1230 instead of proceeding to Step 1225. In Step 1230, the CPU 51 reduces the command electric current value Id by an amount "Ipr"

from the present electric current value (=Idbase). That is, from this point, the command electric current value Id is set at a value that is smaller by the amount "Ipr" than the basic electric current value Idbase (see the time point where TA has elapsed from t3 in FIG. 5).

Once the elapsed time Tout reaches the fast pressure-increasing control time T1 (see t4 in FIG. 5), a negative answer "No" is obtained in Step 1210 and the program proceeds to Step 1245. In Step 1245, the CPU 51 judges whether it is immediately after the elapsed time Tout reaches the fast pressure-increasing control time T .

As of now, because it is immediately after the elapsed time Tout reached the fast pressure-increasing control time T1 (i.e., immediately after the starting of the slow pressure-increasing control), an affirmative answer "Yes" is obtained in Step 1245. In Step 1250, the CPU 51 memorizes the vehicle deceleration Dvso at the present moment, which was updated in step 925 in FIG. 9, as the vehicle deceleration Dvso2** at a time of starting the slow pressure-increasing control.

In Step 1255, the CPU 51 obtains the slow pressure-increasing gradient K2 (>0) based upon the vehicle deceleration Dvso2 and a function funcK2. The vehicle deceleration Dvso2 is a value at a time of starting the slow pressure-increasing control. In Step 1260, the CPU 51 obtains the second period of time TB (>0) based upon a gradient difference between the fast pressure-increasing gradient K1 and the slow pressure-increasing gradient K2 (K1-K2) and a function funcTB.

Accordingly, the slow pressure-increasing gradient K2 becomes large as the vehicle deceleration Dvso2 at a time of starting the slow pressure-increasing control is increased. This attributes to the fact that the amount of wheel cylinder pressure reduced during the pressure-reducing control becomes large as the vehicle deceleration Dvso2 at a time of starting the slow pressure-increasing control is increased, so that it is necessary to increase a gradient for raising the wheel cylinder pressure during the pressure-increasing control. Further, the second period of time TB becomes longer as the gradient difference (K1-K2) is increased. This attributes to the fact that an amount of overshooting wheel cylinder pressure becomes large at an initial phase of the slow pressure-increasing control as the gradient difference (K1-K2) is increased. Steps 1250, 1255 and 1260 are not executed when implementing this routine after this time.

In Step 1265, the CPU 51 judges whether the flag F is "1". As of now, because the flag F is "1", an affirmative answer "Yes" is obtained in Step 1265 and the CPU 51 proceeds to Step 1270. In Step 1270, the CPU 51 judges the slow pressure-increasing control duration time (Tout-T) is less than the second period of time TB. As of now, an affirmative answer "Yes" is obtained in Step 1270. In Step 1275, the CPU 51 increases the command electric current value Id by an amount "Iup" from a value at the current moment (=Idbase**). The amount "Iup" is a constant value, according to the embodiment of the present invention.

Subseqently, in Step 1230, The CPU 51 updates the basic electric current value Idbase to a value that is smaller than a present electric current value by a value K2·Δt. The value K2·Δt corresponds to a reduced amount of the basic electric current value Idbase per execution cycle of this routine during the slow pressure-increasing control. The program then proceeds to Step 1240 and to Step 1195 in FIG. 11 via Step 1295 in FIG. 12 and Step 1142 in FIG. 11 and the CPU 51 temporarily terminates the routine illustrated in FIG. 11.

The above described process are repeatedly implemented until the slow pressure-increasing control duration time (Tout-T1) reaches the second period of time TB in a situation where the ABS control stat condition is not established. As a result, in Step 1280, the basic electric current value Idbase is reduced linearly with the slow pressure-increasing gradient K2, and in Step 1275, the command electric current value Id is set to a value increased by the amount "Iup" from the basic electric current value Idbase** (see t4 in FIG. 5).

Once the slow pressure-increasing control duration time (Tout-T1) reaches the second period of time TB, a negative answer "No" is obtained in Step 1270. The program then proceeds to Step 1280 without executing Step 1275. That is, from this point, the command electric current value Id is set to a value equal to the basic electric current value Idbase** (see a time point where TB has elapsed from t4 in FIG. 5). The above-described process is continued until the ABS control start condition for the second cycle is established, i.e., the slow pressure-increasing control of the special linear pressure-increasing control is continued.

Described below is the case where the flag F is "0" (K1≦A). In this case, a negative answer "No" is obtained in Step 1215, and the program proceeds to Step 1230. In Step 1230, the CPU 51 reduces the command electric current value Id by the amount "Ipr" from the basic electric current value Idbase during a period of time starting from the time, at which the special linear pressure-increasing control is started, and ending where the fast pressure-increasing control time T1 is elapsed from the time of starting the special linear pressure-increasing control, i.e., while the fast pressure-increasing control is being executed.

Further, a negative answer "No" is obtained in Step 1265, and the program proceeds to Step 1280. That is, the CPU 51 sets the command electric current value Id to a value equal to the basic electric current value Idbase over the duration time of the slow moderate pressure-increasing control.

As described above, the special linear pressure-increasing control is executed. When the ABS control start condition for the second cycle is established (see t5 in FIG. 5), an affirmative answer "Yes" is obtained in Step 1140, and the program proceeds to Step 1144. In Step 1144, the CPU 51 changes the value of the variable CYCLE from "1" to "2". In Step 1146, the CPU 51 changes the value of the valuable Mode from "3" to "1".

The CPU 51 then proceeds to Step 1148, in which the CPU 51 stores the basic electric current value Idbase at the present time (i.e., where the special linear pressure-increasing control is terminated) as the actual pressure difference corresponding electric current value Idc at a time of starting the pressure-reducing control. Sequentially, in Step 1150, the CPU 51 resets the duration time Trdc. Here, the duration time Trdc is a period of time elapsed from the time of starting the pressure-reducing control (see time t5 in FIG. 5). The CPU 51 then proceeds to Step 1152 and, likewise as in Step 1025, the CPU 51 memorizes, as a pressure-reducing control start-timing vehicle deceleration DVso1, the vehicle deceleration DVso at the present moment (i.e., at a time of starting the pressure-reducing control).

Accordingly, the value of the variable CYCLE** is "2". As a result, a negative answer "No" is obtained in Step 1102 and the program proceeds to Step 1195, wherein the CPU 51 temporarily terminates the routine in FIG. 11. In this case, because Step 1142 is not implemented, the routine in FIG. 12 (i.e., the special linear pressure-increasing control) is not implemented either. As described, the first control cycle is completed.

Figure 13:
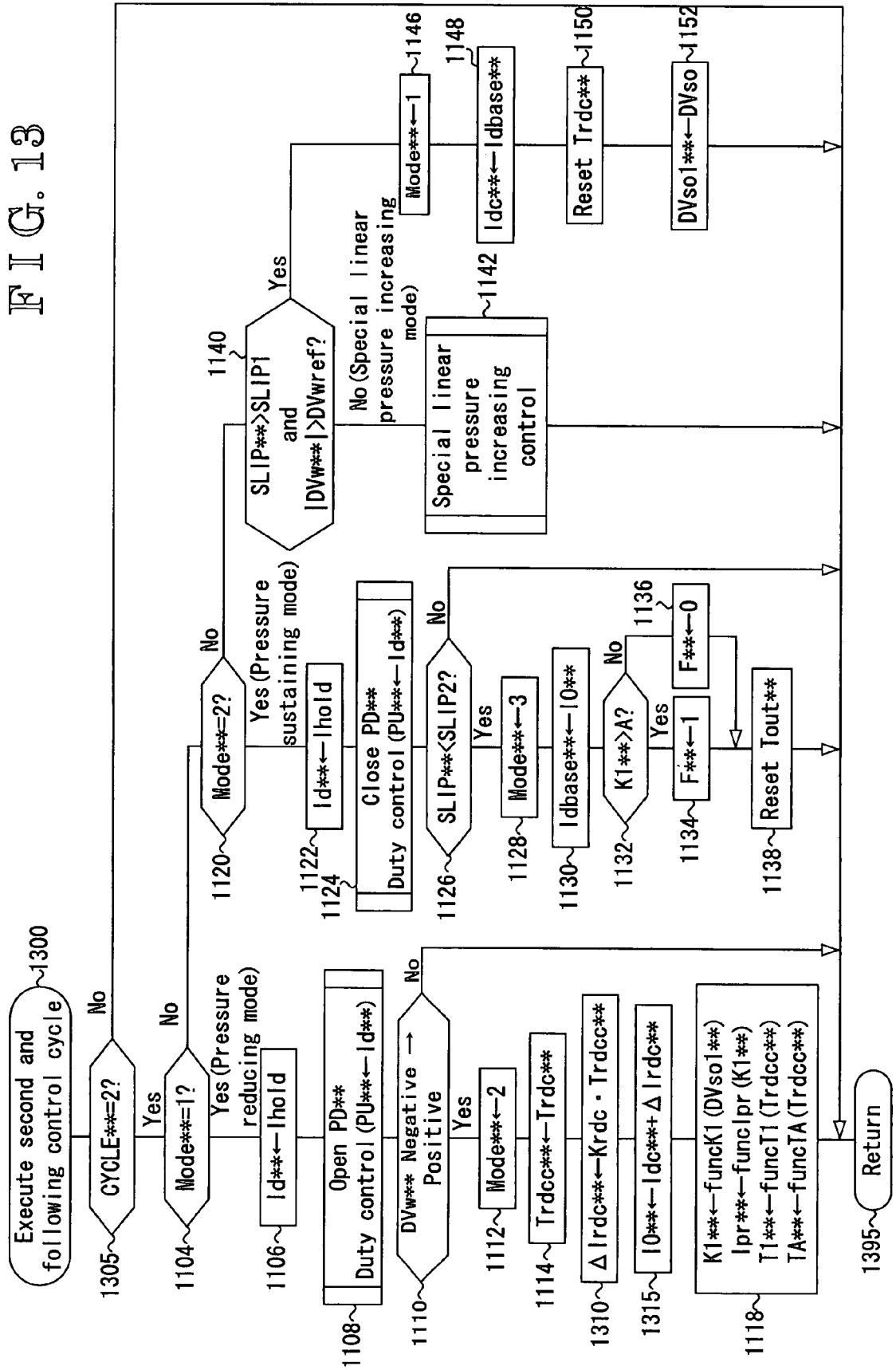
FIG. 13 is a flowchart for explaining a routine for executing the ABS control for a second or following control cycle by the CPU in FIG. 1.

Meanwhile, the CPU 51 repeatedly executes the routine for the second or following control cycle in FIG. 13 every predetermined elapsed time. Steps in FIG. 13, which are implemented for the same as Steps in FIG. 11, are attached with identical step numerals to the ones in FIG. 11, so that the description thereof will be omitted.

In the routine in FIG. 13, Steps 1102 in FIG. 11 is changed to Step 1305, Step 1116 in FIG. 11 is changedto Steps 1310 and 1315, and Step 1144 in FIG. 11 is omitted.

That is, in a predetermined elapsed time, the CPU 51 starts from Step 1300 and proceeds to Step 1305. In Step 1305, the CPU 51 judges whether the value of the variable CYCLE** is "2". When a negative answer "No" is obtained in Step 1305, the program proceeds to Step 1395 and the CPU 51 temporarily terminates the routine in FIG. 13.

As of now, assuming it is immediately after the second ABS control start condition is established and immediately after the value of the variable CYCLE is changed from "1" to "2" (t5 in FIG. 5), an affirmative answer "Yes" is obtained in Step 1305 and the program proceeds to Step 1104. Here, because the value of the valuable Mode is "1" by the last step 1146, an affirmative answer "Yes" is obtained in Step 1104.

As a result, in the same manner as the first control cycle, the pressure-reducing control, the pressure-sustaining control and the special linear pressure-increasing control are implemented in sequence as for the wheel. Further, Steps 1310 and 1315 correspond to the formulas (2) and (3). As "Trdc" in Step 1114, the time reset in Step 1150, is employed. As "Idc**" in Step 1315, the value stored in Step 1148 is employed.

When the third or following ABS control start condition is established, in the same manner as the second control cycle, the routine in FIG. 13 is executed.

The above described operation executed by the CPU 51 is implemented unless the ABS control termination condition for the wheel in Step 1035 in the routine in FIG. 10, in which Steps 1005 and 1035 are repeated, is established. Therefore, when the ABS control termination condition in Step 1035 is established, e.g., when a driver stops operating the brake pedal BP during the above described operation, an affirmative answer "Yes" is obtained in Step 1035. The program then proceeds to Step 1040. In Step 1040, the CPU 51 changes the value of the variable CYCLE from "1" or "2" to "0". In Step 1045, the CPU 51 executes a predetermined ABS control termination control for the wheel. As described above, a series of ABS control executed for the wheel is terminated.

Later on, when the program proceeds to Step 1005, an affirmative answer "Yes" is obtained in Step 1005. In Step 1010, the CPU 51 monitors whether the ABS control start condition is established again.

As described above, in the vehicle anti-skid control apparatus of the embodiment, a normally opened linear solenoid valve is adopted as a pressure-increasing valve PU, and a normally closed on/off solenoid valve is adopted as a pressure-reducing valve PD. The ABS control, which includes as a set a combination of the pressure-reducing control, the pressure-sustaining control and the special linear pressure-increasing control, is repeated.

In the special linear pressure-increasing control, the fast pressure-increasing control is continued for the fast pressure-increasing control time T1 (t3 to t4 in FIG. 5), and sequentially, the slow pressure-increasing control is executed. While the command electric current value Id for the pressure-increasing value PU** is in principle set to a value equal to the basic electric current value Idbase, the command electric current value Id is shifted in a direction to be reduced from the basic electric current value Idbase by the first change amount Ipr over the fast pressure-increasing control (t3 to t4) (Id=Idbase−Ipr).

Moreover, when the fast pressure-increasing gradient K1 is greater than the threshold value A, the command electric current value Id is shifted in a direction to be further reduced by the second change amount Idown over the first period of time TA from a time point where the fast pressure-increasing control is started (t3) (Id=Idbase−Ipr−Idown). In this case, the command electric current value Id is shifted in a direction to be increased by the third change amount Iup from the basic electric current value Idbase over the second period of time TB from a time point where the slow pressure-increasing control is started (t4) (Id=Idbase+Iup).

According to the embodiment, because the command electric current value Id for the pressure-increasing valve PU** is changed from the basic electric current value Idbase as described above, it is possible to effectively restrain "wheel cylinder pressure-increasing delay" and "overshooting of the wheel cylinder pressure". As a result, even when the fast pressure-increasing control is implemented, the wheel cylinder pressure PW over the pressure-increasing control substantially matches a target wheel cylinder pressure Pwt corresponding to the basic electric current value Idbase.

Further, according to the embodiment, the third change amount Iup is a constant value and the second period of time TB varies in response to the gradient difference (K1-K2). Alternatively, the second period of time TB may be a constant value and the third change amount Iup may vary in response to the gradient difference (K1-K2). In this case, it is preferable that the third change amount Iup becomes large as the gradient difference (K1-K2) is increased. Further, both of the second period of time TB and the third change amount Iip may vary in response to the gradient difference (K1-K2).

Still further according to the embodiment, the command electric current value Id is constantly changed to be reduced from the basic electric current value Idbase by the first change amount Ipr over the fast pressure-increasing control. Alternatively, the command electric current value Id can be changed to be reduced from the basic electric current value Idbase by the first change amount Ipr over the fast pressure-increasing control only when the fast pressure-increasing gradient K1 is greater than a threshold value B (<the threshold value A).

Still further according to the embodiment, during the special linear pressure-increasing control, the fast pressure-increasing control is first executed and sequentially the slow pressure-increasing control is executed. Alternatively, only the fast pressure-increasing control can be executed during the special linear pressure-increasing control. In this case, the third change amount Iup is not applied.

The anti-skid control apparatus according to the present invention is applied to a control unit including a pressure-increasing valve and a pressure-decreasing valve. The pressure-increasing valve is a linear solenoid valve adapted to adjust a pressure difference between a master cylinder pressure and a wheel cylinder pressure in accordance with an actual electric current applied thereto. The pressure-reducing valve is a on/off solenoid valve operated in response to an actual electric current applied thereto. The anti-skid control apparatus then executes an ABS control. In the ABS control, a pressure-reducing control is executed and sequentially a pressure-increasing control is executed. The pressure-reducing control controls the pressure-increasing valve and the pressure-reducing valve and reduces the wheel cylinder pressure. The pressure-increasing control reduces the pressure difference with the pressure-reducing valve being in a closed state and (linearly) increases the wheel cylinder pressure.

Here, the pressure-increasing valve can be either a normally opened linear solenoid valve or a normally closed linear solenoid valve. The normally opened linear solenoid valve is in an opened state when being applied with electric current at "0", and the normally closed linear solenoid valve is in a closed state when being applied with electric current at "0". However, in view of the pressure increasing valve normally maintained in an opened state, the pressure-increasing valve, which is a normally opened linear solenoid valve, is preferable in reducing energy consumption and enhancing durability thereof. Further, the pressure-reducing valve can be either a normally closed on/off solenoid valve or a normally closed linear solenoid valve. The normally closed on/off solenoid valve is a solenoid valve selectively in an opened state or in a closed state in response to an actual electric current applied thereto. Still further, in the ABS control, a pressure-sustaining control can be implemented between the pressure-reducing control and the linear pressure-increasing control.

The anti-skid control apparatus further includes electric current controlling means for controlling the value of electric current, which is being applied to the first solenoid valve and equal to or greater than a predetermined electric current value, to a value of electric current corresponding to the pressure difference between the master cylinder pressure and the wheel cylinder pressure at a time point where the pressure-increasing control is started. When a normally opened linear solenoid valve is applied as the pressure-increasing valve, a basic electric current value is set so as to linearly reduce with a first gradient. When a normally closed linear solenoid valve is applied as the pressure-increasing valve, a basic electric current value is set so as to linearly increase with the first gradient. An initial value of the basic electric current value (i.e., a basic electric current value at a time point for starting the pressure-increasing control) is set to a value for example equal to an actual pressure difference corresponding electric current value at a time of starting the pressure-increasing control. The first gradient is determined based upon a braking condition of a vehicle. Mores specifically, the first gradient is determined for example based upon a deceleration of the vehicle at a time of starting the pressure-reducing control.

The anti-skid control apparatus further includes changing means for changing the value of electric current controlled by the electric current controlling means in a direction to be reduced for a first period of time during the pressure-increasing control as the estimated amount of the wheel cylinder pressure reduced by the pressure-reducing control is increased or becomes larger, when the estimated amount of the wheel cylinder pressure reduced by the pressure-reducing control is equal to or greater than a predetermined value. Therefore, because a force for moving the valve body of the linear solenoid valve in a valve-opening direction is increased by a force amount corresponding to the change amount by the changing means, "wheel cylinder pressure-increasing delay" is restrained at a certain degree. When the normally opened time linear solenoid valve is applied, the value of electric current is reduced, and when the normally closed time linear solenoid valve is applied, the value of electric current is increased. The changing amount can be a constant value or a variable determined in response to the first gradient.

The changing amount includes a first change amount, by which the electric current for the first linear solenoid valve is changed from the basic electric current value. The changing amount can include a second change amount, by which the electric current value changed by the first change amount is further changed in a direction for reducing the pressure difference.

Here, the valve body of the linear solenoid valve is further easily moved in a valve-opening direction with a force corresponding to the first change amount and the second change amount. As a result, a delay in opening the valve body is restrained more reliably and "wheel cylinder pressure-increasing delay" is restrained more effectively.

A period of time for the pressure-increasing control may include a first pressure-increasing phase and a second pressure-increasing phase. In this case, it is preferable that the value of electric current controlled by the electric current controlling means is gradually reduced with the first gradient during the first pressure-increasing phase and is gradually reduced with a second gradient smaller than the first gradient during the second pressure-increasing phase, wherein the changing means changes the value of electric current controlled by the electric current controlling means in a direction to be reduced during the first pressure-increasing phase and changes a value of electric current at a time point of starting the second pressure-increasing phase in a direction to largely increase the pressure difference as the changing means largely reduces the value of electric current controlled by the electric current controlling means at the time point of starting the second pressure-increasing phase. In this case, it is possible to effectively restrain "wheel cylinder pressure-increasing delay" that is especially remarkable at an early stage of the (linear) pressure-increasing control. Further, it is possible to prevent an occurrence generated by largely changing the electric current value from the basic electric current value in a pressure-difference reduction direction over a long period of time, an occurrence which is for example the wheel cylinder pressure exceeding a value (target value) corresponding to the basic electric current value.

The changing means increases the first period of time for reducing the value of electric current as a pressure-reducing time, in which the pressure-reducing control is executed prior to the pressure-increasing control, is large.

As the period of time for the pressure-reducing control extends, the amount of the wheel cylinder pressure reduced by the pressure-reducing control is increased. Sequentially, an amount of operation fluid required to increase the wheel cylinder pressure is increased during the linear pressure-increasing control. As a result, as the period of time for the pressure-reducing control extends, "wheel cylinder pressure-increasing delay" at an early stage of the linear pressure-increasing control is likely to be remarkable.

According to the present invention, the first period of time is extended as the period of time for the pressure-reducing control extends, and "wheel cylinder pressure-increasing delay" can be stably restrained regardless of the period of time for the pressure-reducing control.

The second change amount can vary in response to the period of time for the pressure-reducing control. In this case, the second change amount can be increased, as the period of time for the pressure-reducing control extends. As a result, as described above, "wheel cylinder pressure-increasing delay" can be stably restrained regardless of the period of time for the pressure-reducing control.

It is preferable that the electric current value is changed by the second change amount only when the first gradient (absolute value) is greater than a predetermined threshold value (positive value). When a gradient of the basic electric current value (i.e., the first gradient) is slow, "wheel cylinder pressure-increasing delay" does not occur easily. Therefore, according to the embodiment, it is possible to unnecessarily largely change the electric current value from the basic electric current value in a direction corresponding to a pressure difference reduction.

There is a situation where the basic electric current value is linearly reduced or increased with the first gradient until a predetermined elapsed time passes from a time point where the pressure-increasing control is started and, in the predetermined elapsed time, is linearly reduced or increased with the second gradient, of which absolute value is smaller than the one of the first gradient. In other words, during the pressure-increasing control, the fast pressure-increasing control with the first gradient is executed for an initial predetermined phase, and sequentially a slow moderate pressure-increasing control with the second gradient is executed.

In this case, it is preferable that the changing means changes the electric current value with the first change amount from the start point of the pressure-increasing control to a time point where the predetermined elapsed time passes from the start point of the pressure-increasing control, i.e., over the fast pressure-increasing control or an initial partial period of time. This attributes to the fact that "wheel cylinder pressure-increasing delay" becomes remarkable at the early stage of the pressure-increasing control and when the gradient of the basic electric current value is large. Further, the changing means changes the electric current value with the second change amount only within a period of time where the electric current value is changed with the first change amount. In this case, the changing means changes the electric current value with the second change amount over the fast pressure-increasing control or an initial partial period of time.

As described above, where the fast pressure-increasing control is executed for an initial predetermined period of time of the pressure-increasing control and sequentially the slow pressure-increasing control is expected, and where the changing means changes the electric current value over the fast pressure-increasing control or during an initial partial period thereof, it is preferable that the changing means changes the electric current value in a direction corresponding to the pressure difference increase from the value controlled by the electric current controlling means (i.e., the basic electric current value) by the third change amount, when the predetermined elapsed time passes (i.e., when the slow pressure-increasing control is started).

As described above, the electric current is shifted from the basic electric current value by the changing means with the first change amount and the second change amount during the fast pressure-increasing control, which leads to changing the electric current value largely in a direction corresponding to the pressure difference reduction. In such circumstances, when the pressure-increasing control is shifted from the fast pressure-increasing control to the slow pressure-increasing control, the wheel cylinder pressure is likely to exceed a value (target value) corresponding to the basic electric current value. This is referred to "wheel cylinder pressure overshooting".

The third change amount is employed for the purpose of restraining "wheel cylinder pressure overshooting". That is, when the electric current value is changed from the basic electric current value in a direction to increase the pressure difference at a time point where the slow pressure-increasing control is started, the valve element of the linear solenoid valve is easily moved in a valve-opening direction from the time point where the slow pressure-increasing control is started. As a result, the wheel cylinder pressure is not increased easily and "wheel cylinder pressure overshooting" is restrained.

The second gradient is determined based upon a braking condition of the vehicle, for example. More specifically, the second gradient is determined based upon a deceleration of the vehicle at a point where the slow pressure-increasing control is started. Further, the predetermined period of time, i.e., a duration time of the fast pressure-increasing control is determined based upon a duration time of the pressure-reducing control.

It is preferable that the changing means changes the electric current value with the third amount only for a second period of time from a time point where the predetermined period of time has passed. In this case, it is possible to effectively restrain "wheel cylinder pressure overshooting" that may be especially remarkable at the early stage of the slow pressure-increasing control. In addition, it is possible to prevent an occurrence generated by largely changing the electric current value from the basic electric current value in a pressure-difference increasing direction over a long period of time, an occurrence which is for example the wheel cylinder pressure running below a value (target value) corresponding to the basic electric current value.

In this way, when the electric current value is changed only during the second period of time from a time point where the predetermined elapsed time passes, i.e., from a time point where the slow pressure-increasing control is started, it is preferable that the changing means changes the second period of time in response to a difference between the first gradient and the second gradient.

In general, "wheel cylinder pressure overshooting" is likely to be remarkable at the early stage of the slow pressure-increasing control as the difference between the first and second gradients is increased. The above-described structure is related to this view. In the embodiment, the second period of time is set to be long as the difference between the first and second gradients is increased or becomes larger, and as a result it is possible to stably restrain "wheel cylinder pressure overshooting" regardless the difference between the first and second gradients.

Likewise, the changing means can change the third change amount in response to the difference between the first and second gradients. In this case, for example, the third change amount can be set to a large value as the difference between the first and second gradients is increased. As a result, in the same manner as described, "wheel cylinder pressure overshooting" is stably restrained regardless the difference between the first gradient and the second gradient.

Moreover, as described above, when the changing means changes the electric current value by the second change amount only when the first gradient (absolute value) is greater than a predetermined threshold value (positive value), it is preferable that the changing means changes the electric current value by the third change amount only when the first gradient (absolute value) is greater than the predetermined threshold value.

As described above, "wheel cylinder pressure overshooting" is likely to be easily generated because the electric current value is changed largely in a direction to reduce the pressure difference by the first change amount and the second change amount during the fast pressure-increasing control. In other words, unless the changing means changes the electric current value by the second change amount, there is low necessity to change the electric current by the third change amount by the changing means.

The above-described structure is related to such view. In other words, in the embodiment, when the changing means does not change the electric current by the second change amount, the changing means does not change the electric current by the third change amount. Therefore, during the slow pressure-increasing control, the electric current value is not unnecessarily changed largely in a direction corresponding to a pressure-difference increase from the basic electric current value.

The principles, the preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An anti-skid control apparatus comprising:
a master cylinder pressurizing a brake fluid and generating a master cylinder pressure in response to an operation at a brake pedal;
a wheel cylinder mounted at a wheel and connected to the master cylinder via a first fluid passage, the wheel cylinder applying a wheel cylinder pressure, which is generated based upon the master cylinder pressure, to the wheel;
a first solenoid valve disposed at the first fluid passage, the first solenoid valve configured to vary between a closed state and an opened state in response to a value of electric current applied thereto, so that a pressure difference between the master cylinder pressure and the wheel cylinder pressure is adjusted in response to the value of electric current applied thereto and a fluid communication between the master cylinder and the wheel cylinder via the first fluid passage is interrupted with the first solenoid valve in the closed state when the first solenoid valve is applied with electric current at a value equal to or greater than a predetermined electric current value;
a second solenoid valve connected to the wheel cylinder at one port via a second fluid passage and connected to a reservoir at an other port, the second solenoid valve configured to selectively be in a closed state or an opened state in response to a value of electric current applied thereto so that a fluid communication between the wheel cylinder and the reservoir via the second fluid passage is interrupted when the second solenoid valve is in the closed state and is established when being in the opened state; and
a hydraulic pump having a suction portion connected to the reservoir and an outlet portion connected to the first fluid passage between the master cylinder and the first solenoid valve,
wherein, when the anti-skid control apparatus confirms the wheel is to be locked in response to the operation at the brake pedal, the anti-skid control apparatus executes a pressure-reducing control for draining brake fluid in the wheel cylinder to the reservoir and reducing the wheel cylinder pressure by applying electric current at the value equal to or greater than the predetermined electric current value to the first solenoid valve and controlling the first solenoid valve to the closed state and by applying electric current to the second solenoid valve and controlling the second solenoid valve to the opened state, and, when the anti-skid control apparatus confirms that the wheel is released from a state to be locked by the pressure-reducing control, the anti-skid control apparatus executes a pressure-increasing control for gradually increasing the wheel cylinder pressure reduced by the pressure-reducing control: by applying electric current to the second solenoid valve and controlling the second solenoid valve to the closed state; by estimating an amount of the wheel cylinder pressure reduced by the pressure-reducing control; and by reducing the pressure difference by gradually reducing the value of electric current, which is being applied to the first solenoid valve, with a first gradient that increases in association with an increase of the estimated amount of the wheel cylinder pressure reduced by the pressure-reducing control, the anti-skid control apparatus further comprising:
electric current controlling means for, at the start of the pressure-increasing control, controlling the value of electric current, which is being applied to the first solenoid valve and equal to or greater than the predetermined electric current value, to a value of electric current corresponding to the pressure difference between the master cylinder pressure and the wheel cylinder pressure at a time point where the pressure-increasing control is started; and
changing means for changing the value of electric current controlled by the electric current controlling means in a direction to be reduced for a first period of time during the pressure-increasing control prior to the gradual reducing of the value of electric current by an amount which increases in association with an increase of the estimated amount of the wheel cylinder pressure reduced by the pressure-reducing control.

2. An anti-skid control apparatus according to claim 1, wherein the changing means increases the first period of time for reducing the value of electric current as a pressure-reducing time, in which the pressure-reducing control is executed prior to the pressure-increasing control, extends.

3. An anti-skid control apparatus according to claim 1, wherein the changing means reduces the value of electric current largely as a pressure-reducing time, in which the pressure-reducing control is executed prior to the pressure-increasing control, extends.

4. An anti-skid control apparatus according to claim 1, wherein the amount of the wheel cylinder pressure reduced by the pressure-reducing control is estimated based upon a pressure-reducing time, in which the pressure-reducing control is executed prior to the pressure-increasing control.

5. An anti-skid control apparatus according to claim 1, wherein the amount of the wheel cylinder pressure reduced by the pressure-reducing control is estimated based upon a deceleration of a vehicle.

6. An anti-skid control apparatus according to claim 1, wherein a period of time for the pressure-increasing control includes a first pressure-increasing phase and a second pressure-increasing phase, and the value of electric current controlled by the electric current controlling means is gradually reduced with the first gradient during the first pressure-increasing phase and is gradually reduced with a second gradient smaller than the first gradient during the second pressure-increasing phase, wherein the changing means changes the value of electric current controlled by the electric current controlling means in a direction to be reduced during the first pressure-increasing phase and changes a value of electric current at a time point of starting the second pressure-increasing phase in a direction to largely increase the pressure difference as the changing means largely reduces the value of electric current controlled by the electric current controlling means at the time point of starting the second pressure-increasing phase.

7. An anti-skid control apparatus according to claim 6, wherein the second pressure-increasing phase becomes long in proportion to a gradient difference between the first gradient and the second gradient.

8. An anti-skid control apparatus according to claim 6, wherein the changing means changes the value of electric current at the time point of starting the second pressure-increasing phase largely as a gradient difference between the first gradient and the second gradient is increased.

9. An anti-skid control apparatus according to claim 6, wherein the first period of time is located at an early stage of the first pressure-increasing phase of the pressure-increasing control.

* * * * *